(12) United States Patent
Tsai et al.

(10) Patent No.: US 12,452,512 B2
(45) Date of Patent: Oct. 21, 2025

(54) CAMERA MODULE, ELECTRONIC DEVICE AND VEHICLE INSTRUMENT

(71) Applicant: LARGAN PRECISION CO., LTD., Taichung (TW)

(72) Inventors: Wen-Yu Tsai, Taichung (TW); Chien-Pang Chang, Taichung (TW); Lin-An Chang, Taichung (TW); Ming-Ta Chou, Taichung (TW); Cheng-Feng Lin, Taichung (TW); Kuo-Chiang Chu, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 492 days.

(21) Appl. No.: 17/725,581

(22) Filed: Apr. 21, 2022

(65) Prior Publication Data
US 2022/0407993 A1    Dec. 22, 2022

Related U.S. Application Data

(60) Provisional application No. 63/209,016, filed on Jun. 10, 2021.

(30) Foreign Application Priority Data

Oct. 8, 2021 (TW) .................. 110137630

(51) Int. Cl.
*H04N 23/55*   (2023.01)
*G02B 1/115*   (2015.01)
(Continued)

(52) U.S. Cl.
CPC ............. *H04N 23/55* (2023.01); *G02B 1/115* (2013.01); *H04N 23/54* (2023.01); *H04N 23/57* (2023.01)

(58) Field of Classification Search
CPC ........ H04N 23/55; H04N 23/54; H04N 23/57; G02B 1/115; G02B 1/11; G02B 1/14;
(Continued)

(56) References Cited

U.S. PATENT DOCUMENTS 8,629,486 B2   1/2014  Ahn
9,158,039 B2  10/2015  Okuno et al.
(Continued)

FOREIGN PATENT DOCUMENTS

CN     1290930 C   12/2006
CN   107592436 A    1/2018
(Continued)

*Primary Examiner* — Sinh Tran
*Assistant Examiner* — Zhenzhen Wu
(74) *Attorney, Agent, or Firm* — McClure, Qualey & Rodack, LLP

(57) ABSTRACT

A camera module includes an imaging lens assembly module and an image sensor. The image sensor is disposed on an image surface of the imaging lens assembly module and includes a photoelectric converting layer, a micro lens arrays layer, a light filtering layer and an anti-reflecting layer. The photoelectric converting layer is for converting a light signal to an electric signal. The micro lens arrays layer is for converging an energy of the imaging light into the photoelectric converting layer. The light filtering layer is for absorbing a light at a certain wavelength region of the imaging light. The anti-reflecting layer is disposed on a surface of at least one of the light filtering layer and the micro lens arrays layer and includes an irregular nano-crystallite structure layer and an optical connecting layer. The optical connecting layer is connected to the irregular nano-crystallite structure layer.

18 Claims, 25 Drawing Sheets

(51) Int. Cl.
*H04N 23/54* (2023.01)
*H04N 23/57* (2023.01)

(58) Field of Classification Search
CPC .............. G02B 3/0006; H01L 27/1462; H01L 27/14621; H01L 27/14627; H01L 27/14618; H01L 27/14625; G03B 17/12
See application file for complete search history.

(56) References Cited

U.S. PATENT DOCUMENTS

| | | | |
|---|---|---|---|
| 9,158,040 B2 | 10/2015 | Kamiyama et al. | |
| 9,405,044 B2 | 8/2016 | Okuno | |
| 9,709,704 B2 | 7/2017 | Miyahara et al. | |
| 10,063,763 B2 | 8/2018 | Chen et al. | |
| 10,361,230 B2 | 7/2019 | Kuboi | |
| 10,520,647 B2 | 12/2019 | Zhu et al. | |
| 10,527,764 B2 | 1/2020 | Kim et al. | |
| 10,539,716 B2 | 1/2020 | Schulz et al. | |
| 10,727,261 B2 | 7/2020 | Miyata et al. | |
| 10,745,541 B2 | 8/2020 | Kubo et al. | |
| 11,776,976 B2 | 10/2023 | Sugizaki | |
| 2001/0039061 A1* | 11/2001 | Suzuki ............... | H01L 27/14627 257/E27.152 |
| 2006/0061876 A1* | 3/2006 | Yoshitsugu ..... | G02B 15/144113 359/687 |
| 2006/0128836 A1 | 6/2006 | Honda et al. | |
| 2010/0110552 A1* | 5/2010 | Nakazawa ............ | G02B 1/11 359/601 |
| 2010/0290133 A1* | 11/2010 | Sano ....................... | G02B 1/11 359/718 |
| 2012/0050599 A1 | 3/2012 | Chen | |
| 2012/0183730 A1 | 7/2012 | Nakayama | |
| 2013/0273317 A1* | 10/2013 | Nakayama ......... | C08G 73/1046 428/141 |
| 2013/0329295 A1* | 12/2013 | Okuno .................... | G02B 1/11 359/586 |
| 2014/0055571 A1* | 2/2014 | Mori .................... | H04N 13/218 348/47 |
| 2014/0327974 A1 | 11/2014 | Kwon | |
| 2017/0212278 A1* | 7/2017 | Abe ........................ | G02B 1/115 |
| 2017/0315269 A1 | 11/2017 | Ogane | |
| 2018/0013948 A1* | 1/2018 | Chen ..................... | H04N 25/704 |
| 2018/0100957 A1* | 4/2018 | Ye ........................ | G02B 5/0294 |
| 2018/0269247 A1* | 9/2018 | Kumai .............. | H01L 27/14627 |
| 2018/0282521 A1* | 10/2018 | Kubo ..................... | C08K 5/521 |
| 2019/0235134 A1 | 8/2019 | Ibuki et al. | |
| 2019/0259787 A1 | 8/2019 | Lee | |
| 2020/0240011 A1* | 7/2020 | Kauppinen ............. | C23C 16/56 |
| 2020/0310017 A1 | 10/2020 | Yu | |
| 2020/0408598 A1 | 12/2020 | Toda et al. | |
| 2021/0003753 A1 | 1/2021 | Kim et al. | |
| 2021/0072439 A1 | 3/2021 | Cho et al. | |
| 2021/0136264 A1 | 5/2021 | Kim et al. | |
| 2022/0394845 A1 | 12/2022 | Chang | |

FOREIGN PATENT DOCUMENTS

| | | |
|---|---|---|
| CN | 112835175 A | 5/2021 |
| JP | S61124901 A | 6/1986 |
| JP | 2000156486 A | 6/2000 |
| JP | 2001230396 A | 8/2001 |
| JP | 2003037257 A | 2/2003 |
| JP | 2006332433 A | 12/2006 |
| JP | 2012174885 A | 9/2012 |
| JP | 2016057335 A | 4/2016 |
| JP | 2019036788 A | 3/2019 |
| JP | 2019113604 A | 7/2019 |
| JP | 2019145563 A | 8/2019 |
| TW | I365308 B | 6/2012 |
| WO | 2017126329 A1 | 7/2017 |
| WO | 2018074137 A1 | 4/2018 |

\* cited by examiner

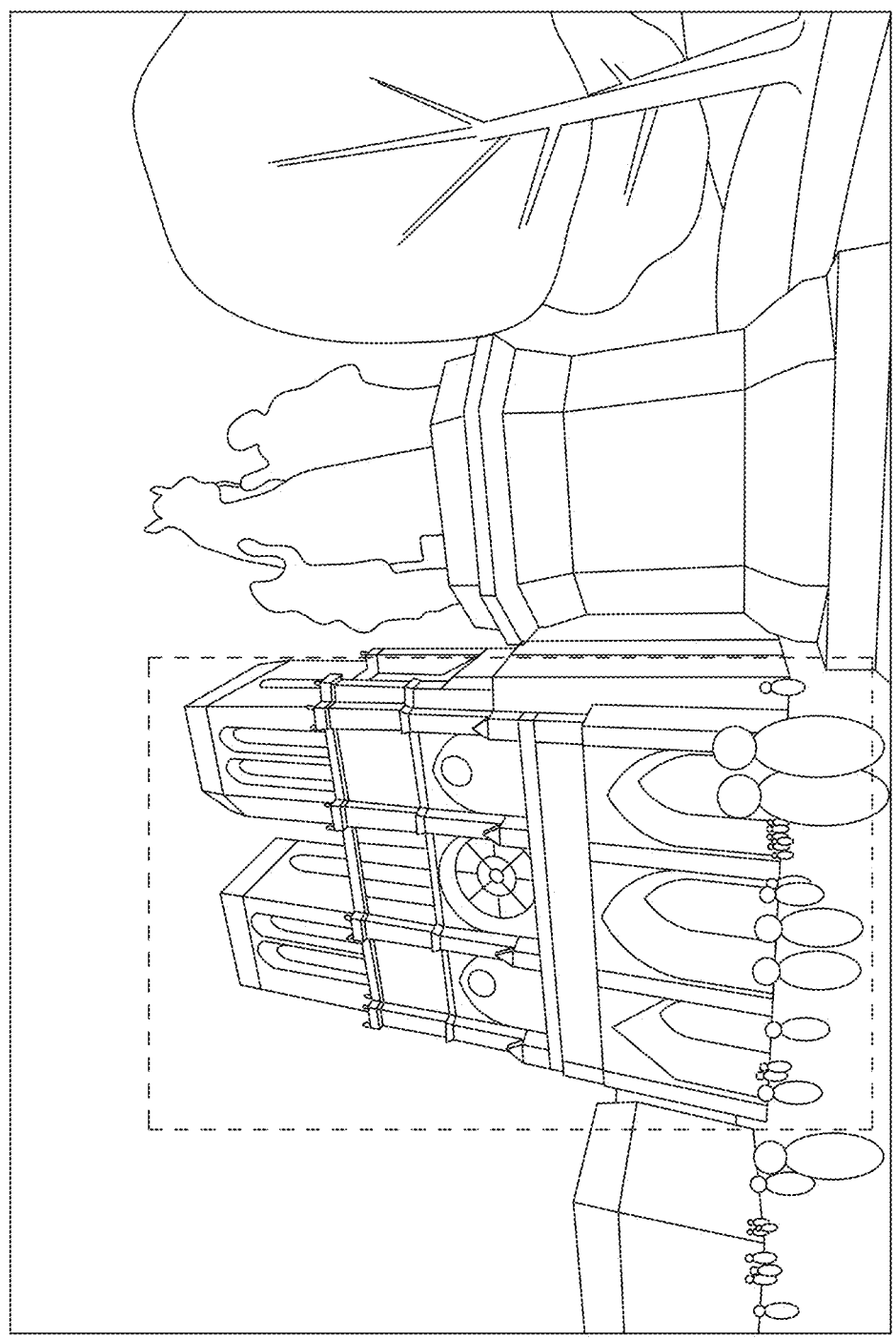

CAMERA MODULE, ELECTRONIC DEVICE AND VEHICLE INSTRUMENT

RELATED APPLICATIONS

This application claims priority to U.S. Provisional Application Ser. No. 63/209,016, filed Jun. 10, 2021 and Taiwan Application Serial Number 110137630, filed Oct. 8, 2021, which are herein incorporated by reference.

BACKGROUND

Technical Field

The present disclosure relates to a camera module, an electronic device and a vehicle instrument. More particularly, the present disclosure relates to a camera module, an electronic device and a vehicle instrument which have an anti-reflecting layer.

Description of Related Art

In recent years, camera modules which are developed rapidly and have been filled with the lives of modern people are applied in various fields such as portable electronic devices, head mounted devices, vehicle instruments and etc. Accordingly, the camera module and the image sensor are also flourished. However, as technology is more and more advanced, demands for the quality of the camera module of users have become higher and higher, wherein the micro lens arrays layer is one of the major factors of image quality.

FIG. 13A shows a schematic view of a camera module according to the prior art. FIG. 13B shows a picture of the micro lens arrays layer ML of the camera module in FIG. 13A. FIG. 13C shows a picture of stray light SL generated by the micro lens arrays layer ML of the camera module in FIG. 13A. FIG. 13D shows a schematic view of intensity simulation of stray light SL in FIG. 13C. In the prior art shown in FIGS. 13A to 13D, when an imaging light L enters the camera module, an image sensor I of the camera module will cause light diffraction due to the micro lens arrays layer ML disposed on an object-side surface of the image sensor I. In the result, the imaging light L reflects between the micro lens arrays layer ML and an optical plat F along a light path L2 so as to generate stray light SL, and the paddle flare which can be one kind of stray light SL can affect image quality severely. Therefore, developing a camera module which can remove stray light effectively and improve light-gathering ability becomes an important and solving problem in industry.

SUMMARY

According to one aspect of the present disclosure, a camera module includes an imaging lens assembly module and an image sensor. The image sensor is disposed on an image surface of the imaging lens assembly module and the image sensor includes a photoelectric converting layer, a micro lens arrays layer, a light filtering layer and an anti-reflecting layer. The photoelectric converting layer is for converting a light signal of an imaging light to an electric signal. The micro lens arrays layer is for converging an energy of the imaging light into the photoelectric converting layer. The light filtering layer is disposed between the photoelectric converting layer and the micro lens arrays layer, and the light filtering layer is for absorbing a light at a certain wavelength region of the imaging light. The anti-reflecting layer is disposed on a surface of at least one of the light filtering layer and the micro lens arrays layer, wherein the anti-reflecting layer includes an irregular nano-crystallite structure layer and an optical connecting layer. The optical connecting layer is connected to the irregular nano-crystallite structure layer.

According to one aspect of the present disclosure, an electronic device includes the aforementioned camera module.

According to one aspect of the present disclosure, a vehicle instrument includes the aforementioned camera module.

According to one aspect of the present disclosure, a camera module includes an imaging lens assembly module and an image sensor. The image sensor is disposed on an image surface of the imaging lens assembly module and the image sensor includes a photoelectric converting layer, a micro lens arrays layer, a light filtering layer and an anti-reflecting layer. The photoelectric converting layer is for converting a light signal of an imaging light to an electric signal. The micro lens arrays layer is for converging an energy of the imaging light into the photoelectric converting layer. The light filtering layer is disposed between the photoelectric converting layer and the micro lens arrays layer, and the light filtering layer is for absorbing a light at a certain wavelength region of the imaging light. The anti-reflecting layer is disposed on a surface of at least one of the light filtering layer and the micro lens arrays layer, wherein the anti-reflecting layer includes an irregular nano structure layer. The irregular nano structure layer has a plurality of porous structures.

According to one aspect of the present disclosure, a camera module includes an imaging lens assembly module and an image sensor. The image sensor is disposed on an image surface of the imaging lens assembly module and the image sensor includes a photoelectric converting layer, a micro lens arrays layer, a light filtering layer and an anti-reflecting layer. The photoelectric converting layer is for converting a light signal of an imaging light to an electric signal. The micro lens arrays layer is for converging an energy of the imaging light into the photoelectric converting layer. The light filtering layer is disposed between the photoelectric converting layer and the micro lens arrays layer, and the light filtering layer is for absorbing a light at a certain wavelength region of the imaging light. The anti-reflecting layer is disposed on a surface of at least one of the light filtering layer and the micro lens arrays layer, wherein the anti-reflecting layer includes an optical multi-membrane stacking structure. A plurality of membrane layers are stacked alternately with high and low material refractive index differences to form the optical multi-membrane stacking structure, and the membrane layers are stacked alternately with high and low material refractive index differences at least three times.

According to one aspect of the present disclosure, an electronic device includes the aforementioned camera module.

According to one aspect of the present disclosure, a vehicle instrument includes the aforementioned camera module.

According to one aspect of the present disclosure, a camera module includes an imaging lens assembly module and an image sensor. The image sensor is disposed on an image surface of the imaging lens assembly module and the image sensor includes a photoelectric converting layer, a micro lens arrays layer, a light filtering layer, a cover glass and an anti-reflecting layer. The photoelectric converting layer is for converting a light signal of an imaging light to an electric signal. The micro lens arrays layer is for converging an energy of the imaging light into the photoelectric converting layer. The light filtering layer is disposed between the photoelectric converting layer and the micro lens arrays layer, and the light filtering layer is for absorbing a light at a certain wavelength region of the imaging light. An inner space layer is formed between the cover glass and the micro lens arrays layer, and the inner space layer is isolated from an outer space of the image sensor. The anti-reflecting layer is disposed on at least one surface of the cover glass, wherein the anti-reflecting layer includes an irregular nano-crystallite structure layer and an optical connecting layer. The optical connecting layer is connected to the irregular nano-crystallite structure layer.

BRIEF DESCRIPTION OF THE DRAWINGS

The present disclosure can be more fully understood by reading the following detailed description of the embodiment, with reference made to the accompanying drawings as follows:

FIG. 10C shows a schematic view of an image captured by the ultra-wide angle camera module according to the 6th embodiment in FIG. 10A.

DETAILED DESCRIPTION

Figure 1:
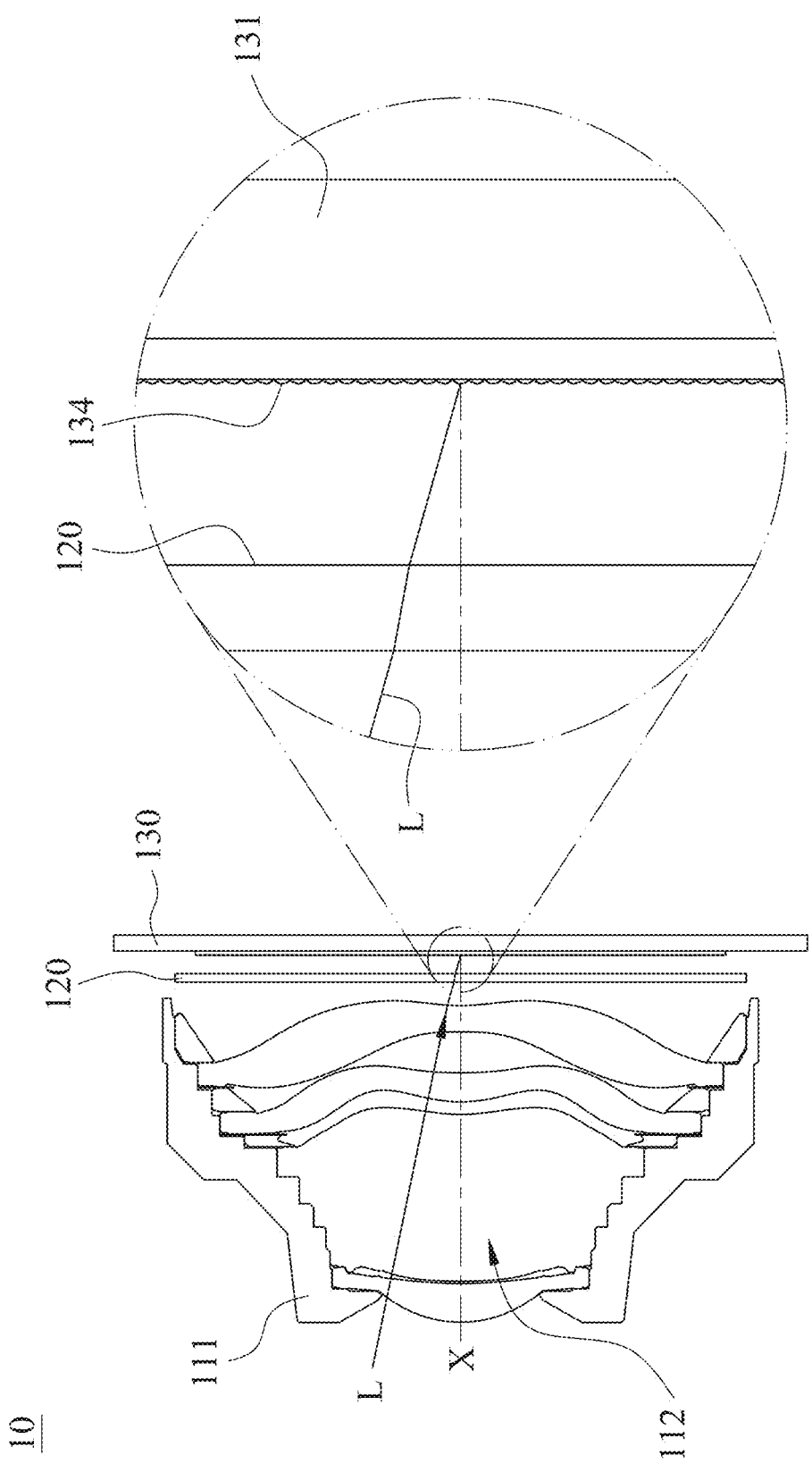
FIG. 1 shows a schematic view of a camera module according to the 1st example of the 1st embodiment of the present disclosure.

The present disclosure provides a camera module which includes an imaging lens assembly module and an image sensor. The image sensor is disposed on an image surface of the imaging lens assembly module and includes a photoelectric converting layer, a micro lens arrays layer, a light filtering layer and an anti-reflecting layer. The photoelectric converting layer is for converting a light signal of an imaging light to an electric signal. The micro lens arrays layer is for converging an energy of the imaging light into the photoelectric converting layer. The light filtering layer is disposed between the photoelectric converting layer and the micro lens arrays layer, and the light filtering layer is for absorbing a light at a certain wavelength region of the imaging light. The anti-reflecting layer is disposed on a surface of at least one of the light filtering layer and the micro lens arrays layer. The image sensor with the anti-reflecting layer can remove stray light effectively in the camera module so as to improve light-gathering ability. Moreover, transmittance of the light filtering layer and color rendition of the image sensor can be improved. Hence, the image quality can be improved.

Specifically, the photoelectric converting layer can include a photoelectric diode and a circuit structure. The photoelectric diode can be for converting a light signal to an electric signal. The circuit structure can be for transmitting and amplifying the electric signal.

The light filtering layer can be a two-dimensional array arranged by light filtering material with various wavelength regions. In detail, the light filtering layer can be arranged in the form of RGGB, and can also be arranged in the form of RYYB, but the present disclosure is not limited thereto. Hence, the light filtering layer can allow the light with the certain wavelength region to pass by, such as red light, yellow light, green light, blue light, infrared light or the combination thereof, but the present disclosure is not limited thereto.

The anti-reflecting layer can include an irregular nano-crystallite structure layer and an optical connecting layer, and the optical connecting layer is connected to the irregular nano-crystallite structure layer. Specifically, the irregular nano-crystallite structure layer can be made of metal oxide. In detail, the irregular nano-crystallite structure layer can be made of aluminum oxide ($Al_2O_3$). Hence, it is favorable for accelerating manufacturing process and mass production.

Or, the anti-reflecting layer can include an irregular nano structure layer. The irregular nano structure layer has a plurality of porous structures. Hence, the anti-reflecting layer can be formed by plasma etching.

Moreover, the anti-reflecting layer can include an optical multi-membrane stacking structure. A plurality of membrane layers are stacked alternately with high and low material refractive index differences to form the optical multi-membrane stacking structure, and the membrane layers are stacked alternately with high and low material refractive index differences at least three times. Specifically, the membrane layers with high material refractive index differences are made of aluminum oxide, the membrane layers with low material refractive index differences are made of silicon oxide ($SiO_2$), but the present disclosure is not limited thereto. Hence, the anti-reflecting layer can be formed by Chemical Vapor Deposition or Physical Vapor Deposition.

The image sensor can further include a cover glass. An inner space layer is formed between the cover glass and the micro lens arrays layer, and the inner space layer is isolated from an outer space of the image sensor. The anti-reflecting layer is disposed on at least one surface of the cover glass, wherein the anti-reflecting layer includes an irregular nano-crystallite structure layer and an optical connecting layer, and the optical connecting layer is connected to the irregular nano-crystallite structure layer. Specifically, the cover glass can be a plate glass. The plate glass and a photosensitive chip can be assembled to a substrate to form the image sensor, the substrate can be a circuit substrate, but the present disclosure is not limited thereto.

The anti-reflecting layer can be disposed on an object-side surface of the micro lens arrays layer. Hence, possibility of generation of non-imaging light from a large angle can be decreased.

The anti-reflecting layer can be disposed between the light filtering layer and the micro lens arrays layer. Hence, color vision of the light filtering layer can be improved.

When a material refractive index of the irregular nano-crystallite structure layer is Nc, and a material refractive index of the optical connecting layer is Nf, the following condition can be satisfied: Nf<Nc. By disposing the irregular nano-crystallite structure layer with the higher material refractive index as an outer layer, transmittance can be improved so as to reduce the reflection of imaging light.

When a height of the irregular nano-crystallite structure layer is Hc, a film thickness of the optical connecting layer is Hf, and a total height of the anti-reflecting layer is H, the following conditions can be satisfied: Hf+Hc=H; and Hf<Hc. Hence, there is no spacing between the top of the optical connecting layer and the bottom of the irregular nano-crystallite structure layer, so that the two layers are connected to each other tightly and have the stronger structural stability.

When the film thickness of the optical connecting layer is Hf, the following condition can be satisfied: 20 nm<Hf<120 nm. By disposing the optical connecting layer with a certain thickness, the coating yield rate and the optical transmittance of the irregular nano-crystallite structure layer can be improved.

When the height of the irregular nano-crystallite structure layer is Hc, the following condition can be satisfied: 120 nm<Hc<350 nm. Hence, the height range which optically matches with the optical connecting layer can be provided.

A top of the optical connecting layer can partially contact an air. Hence, the optical matching of the optical interface between the optical connecting layer and the irregular nano-crystallite structure layer can be adjusted by cooperating with the overall of the irregular nano-crystallite structure layer as a tiny porous structure.

When a size of each of micro lens elements of the micro lens arrays layer is Dp, the following condition can be satisfied: 0.2 μm<Dp<10 μm. Hence, the size of each of the micro lens elements with light-gathering and image resolving power can be provided.

When a number of the micro lens elements of the micro lens arrays layer is PN, the following condition can be satisfied: 7 million<PN<1 billion. Hence, the camera module with high image resolution can be provided.

The camera module can further include a driving device which is for driving the image sensor. Via the configuration of the driving device, the driving ability of image stabilization can be provided on the image sensor. Hence, the function of image stability of the image sensor can be obtained.

The cover glass can include an object-side surface and an image-side surface, and the anti-reflecting layer is disposed on the object-side surface and the image-side surface of the cover glass. Hence, the reflection on the surfaces of the cover glass and the secondary reflection in the cover glass can be effectively reduced.

Each of the abovementioned features of the camera module can be utilized in various combinations for achieving the corresponding effects.

Specifically, the camera module can be a camera module applied for a vehicle, a mobile device or a head-mounted device, but the present disclosure is not limited thereto.

The anti-reflecting layer can be coated during any process in the manufacturing process of the image sensor. In detail, the coating process of the anti-reflecting layer can be done before the process of installing the photosensitive chip on the circuit substrate for coating the anti-reflecting layer on the photosensitive chip. Furthermore, the coating can be done during the manufacturing process of the whole wafer or the manufacturing process of the dies formed after wafer cutting. Or, when the cover glass is removed after packaging the dies, the coating can be done while the dies are exposed on the outer environment. Then, the cover glass is packaged again and the following manufacturing process of the photosensitive chip coated by the anti-reflecting layer is operated thereby; the coating process of the anti-reflecting layer can also be done after the process of installing the photosensitive chip on the circuit substrate for coating the anti-reflecting layer on the photosensitive chip. Furthermore, the photosensitive chip is installed on the circuit substrate in the form of dies, then the overall of the photosensitive chip and the circuit substrate is coated, the coating region is defined by a blocking plate according to requirements, and the following manufacturing process is operated thereby; the coating process of the anti-reflecting layer can also be done during the process which the photosensitive chip is installed on the circuit substrate and the wire bonding is completed. Furthermore, the photosensitive chip is connected to the circuit substrate via golden wires, then the overall of the wire bonded photosensitive chip and the circuit substrate is coated, and the following manufacturing process is operated thereby. The manufacturing process of the image sensor can include die bonding, wire bonding, packaging, circuit substrate inserting injection molding, cutting, but the present disclosure is not limited thereto. The manufacturing process of the wafer can include light sensing layer process, light filtering layer process, micro lens layer process, optical thin layer process, cover membrane layer process, meta-lens process, light blocking layer process, but the present disclosure is not limited thereto.

The present disclosure provides an electronic device including the aforementioned camera module.

The present disclosure provides a vehicle instrument including the aforementioned camera module.

According to the above description of the present disclosure, the following specific embodiments are provided for further explanation.

1st Embodiment

FIG. 1 shows a schematic view of a camera module 10 according to the 1st example of the 1st embodiment of the present disclosure. As shown in FIG. 1, the camera module 10 includes an imaging lens assembly module (its reference numeral is omitted), an optical plate 120 and an image sensor 130. The imaging lens assembly module has an optical axis X. The optical plate 120 is disposed between the imaging lens assembly module and the image sensor 130. The image sensor 130 is disposed on an image surface (not shown) of the imaging lens assembly module and includes a substrate 131, a photoelectric converting layer 132 (shown in FIG. 2A), a micro lens arrays layer 134, a light filtering layer 133 (shown in FIG. 2A) and an anti-reflecting layer 135 (shown in FIG. 2A). The photoelectric converting layer 132 is disposed on an object-side surface of the substrate 131. The photoelectric converting layer 132 is for converting a light signal of an imaging light L to an electric signal. The micro lens arrays layer 134 is for converging an energy of the imaging light L into the photoelectric converting layer 132. The light filtering layer 133 is disposed between the photoelectric converting layer 132 and the micro lens arrays layer 134, and the light filtering layer 133 is for absorbing a light at a certain wavelength region of the imaging light L. When the imaging light enters the camera module, the image sensor with the anti-reflecting layer can remove stray light effectively in the camera module so as to improve light-gathering ability. Moreover, transmittance of the light filtering layer and color rendition of the image sensor can be improved. Hence, the image quality can be improved.

Specifically, the imaging lens assembly module can include a lens barrel 111 and a plurality of lens elements 112. The lens elements 112 are disposed in the lens barrel 111, and arranged in order from an object side of the imaging lens assembly module to an image side thereof. Moreover, other optical elements such as a light blocking sheet, a spacer, a retainer and etc. can be disposed in the lens barrel 111 on demand, but it will not be described herein.

Figure 2A:
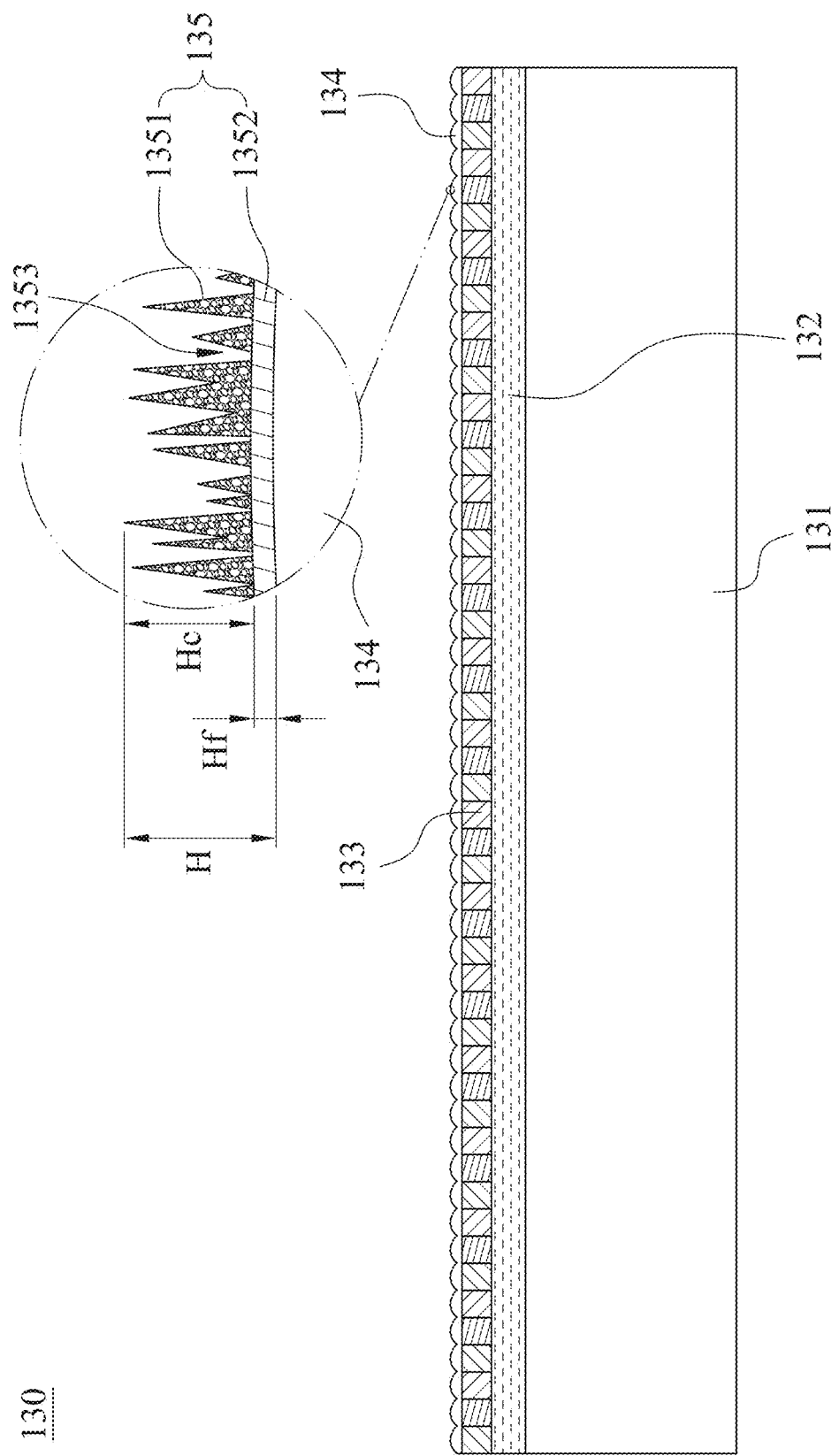
FIG. 2A shows a schematic view of the image sensor according to the 1st example of the 1st embodiment in FIG. 1.
Figure 2C:
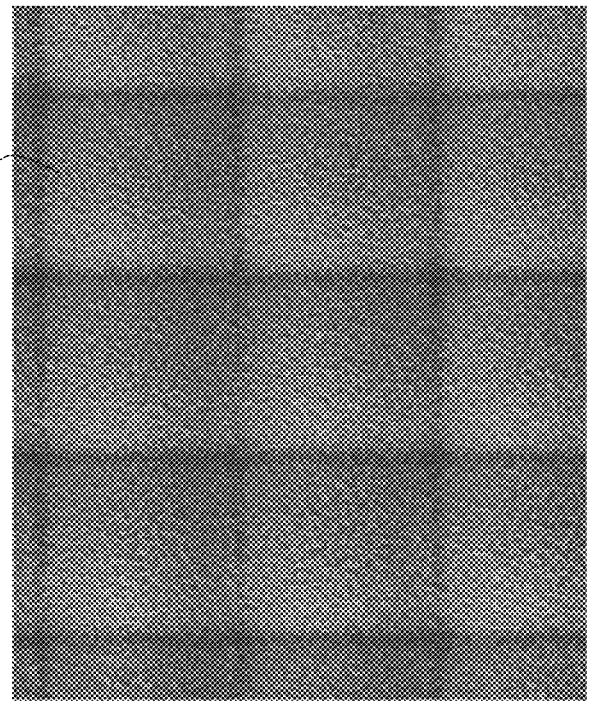
FIG. 2C shows another picture of the micro lens arrays layer captured by an electron microscope according to the 1st example of the 1st embodiment in FIG. 2A.
Figure 2B:
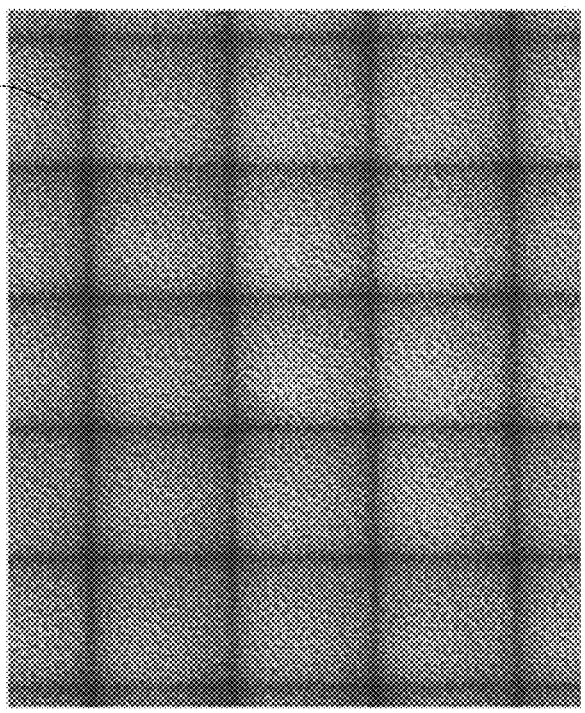
FIG. 2B shows a picture of the micro lens arrays layer captured by an electron microscope according to the 1st example of the 1st embodiment in FIG. 2A.
Figure 2D:
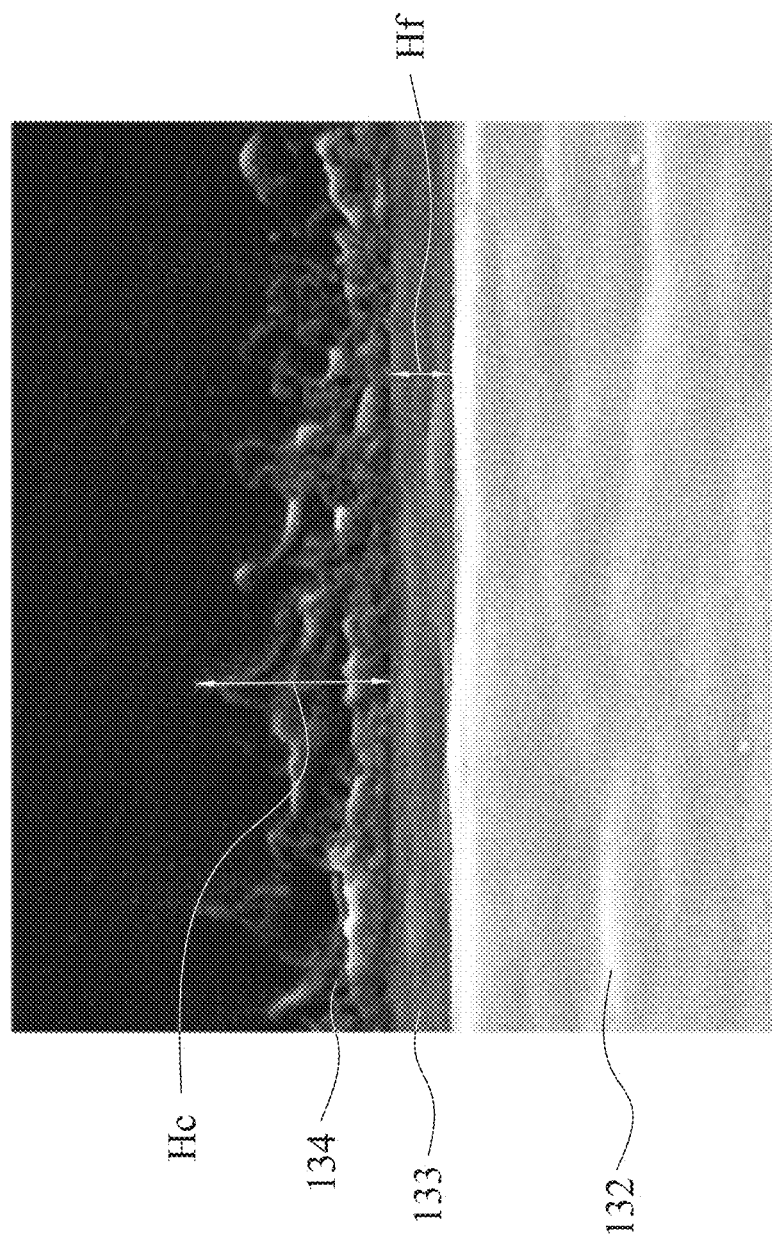
FIG. 2D shows a picture of a cross-sectional side view of the image sensor according to the 1st example of the 1st embodiment in FIG. 2A.

FIG. 2A shows a schematic view of the image sensor 130 according to the 1st example of the 1st embodiment in FIG. 1. FIG. 2B shows a picture of the micro lens arrays layer 134 captured by an electron microscope according to the 1st example of the 1st embodiment in FIG. 2A. FIG. 2C shows another picture of the micro lens arrays layer 134 captured by an electron microscope according to the 1st example of the 1st embodiment in FIG. 2A. FIG. 2D shows a picture of a cross-sectional side view of the image sensor 130 according to the 1st example of the 1st embodiment in FIG. 2A. It has to be specified that the image sensor of the 1st embodiment can provide four different structures of the image sensor 130 of the 1st example, the image sensor 230 (shown in FIG. 3) of the 2nd example, the image sensor 330 (shown in FIG. 4) of the 3rd example and the image sensor 430 (shown in FIG. 5) of the 4th example according to requirements of the optical design. The other elements and the configuration thereof in the 1st example, the 2nd example, the 3rd example and the 4th example according to the 1st embodiment are the same, and it will not be described herein again.

The anti-reflecting layer 135 is disposed on a surface of at least one of the light filtering layer 133 and the micro lens arrays layer 134, wherein the anti-reflecting layer 135 includes an irregular nano-crystallite structure layer 1351 and an optical connecting layer 1352. The optical connecting layer 1352 is connected to the irregular nano-crystallite structure layer 1351. As shown in FIGS. 2A and 2D, in the 1st example, the anti-reflecting layer 135 is disposed on an object-side surface of the micro lens arrays layer 134. FIGS. 2B and 2C show a structure of each of micro lens elements 1341 of the micro lens arrays layer 134 observed by the electronic telescope in different magnification.

Specifically, the irregular nano-crystallite structure layer 1351 can be made of metal oxide; in the 1st example, the irregular nano-crystallite structure layer 1351 is made of aluminum oxide. Moreover, the optical connecting layer 1352 can be made of silicon oxide. Hence, it is favorable for accelerating manufacturing process and mass production.

In the 1st example, a top of the optical connecting layer 1352 partially contacts an air; in other words, the surface which connects the optical connecting layer 1352 and the irregular nano-crystallite structure layer 1351 has an exposed portion 1353 which contacts the air. Moreover, the overall of the irregular nano-crystallite structure layer 1351 is taken as a tiny porous structure. Hence, the optical matching of the optical interface between the optical connecting layer 1352 and the irregular nano-crystallite structure layer 1351 can be adjusted.

The light filtering layer 133 can be a two-dimensional array arranged by light filtering material with various wavelength regions. In detail, the light filtering layer 133 can be arranged in the form of RGGB, and can also be arranged in the form of RYYB, but the present disclosure is not limited thereto. In the 1st example, the light filtering layer 133 is the two-dimensional array arranged by red, green and blue light filtering materials. Hence, the light filtering layer 133 can allow the light with the certain wavelength region to pass by.

In the 1st example, when a material refractive index of the irregular nano-crystallite structure layer 1351 is Nc, a material refractive index of the optical connecting layer 1352 is Nf, a height of the irregular nano-crystallite structure layer 1351 is Hc, a film thickness of the optical connecting layer 1352 is Hf, a total height of the anti-reflecting layer 135 is H, a size of each of micro lens elements 1341 of the micro lens arrays layer 134 is Dp, and a number of micro lens elements 1341 of the micro lens arrays layer 134 is PN, the conditions related to the parameters can be satisfied as the following Table 1.

TABLE 1

| the 1st example of the 1st embodiment | | | |
|---|---|---|---|
| Nc | 1.67 | H (nm) | 322.6 |
| Nf | 1.52 | Dp(μm) | 2.4 |
| Hc (nm) | 247.4 | PN | 0.1 billion |
| Hf (nm) | 75.2 | | |

It is worth to be mentioned that the material refractive index Nc of the irregular nano-crystallite structure layer 1351 is a material refractive index of the irregular nano-crystallite structure layer 1351 which is made of aluminum oxide and presented in form of an optical membrane layer. When the irregular nano-crystallite structure layer 1351 forms a thin membrane in form of the irregular nano-crystallite structure, a partial volume is replaced by the air because of the shape of the structure. In the result, the effective refractive index of the thin membrane varies to 1.00 according to the degree of rarefaction of the crystallite structure.

Figure 3:
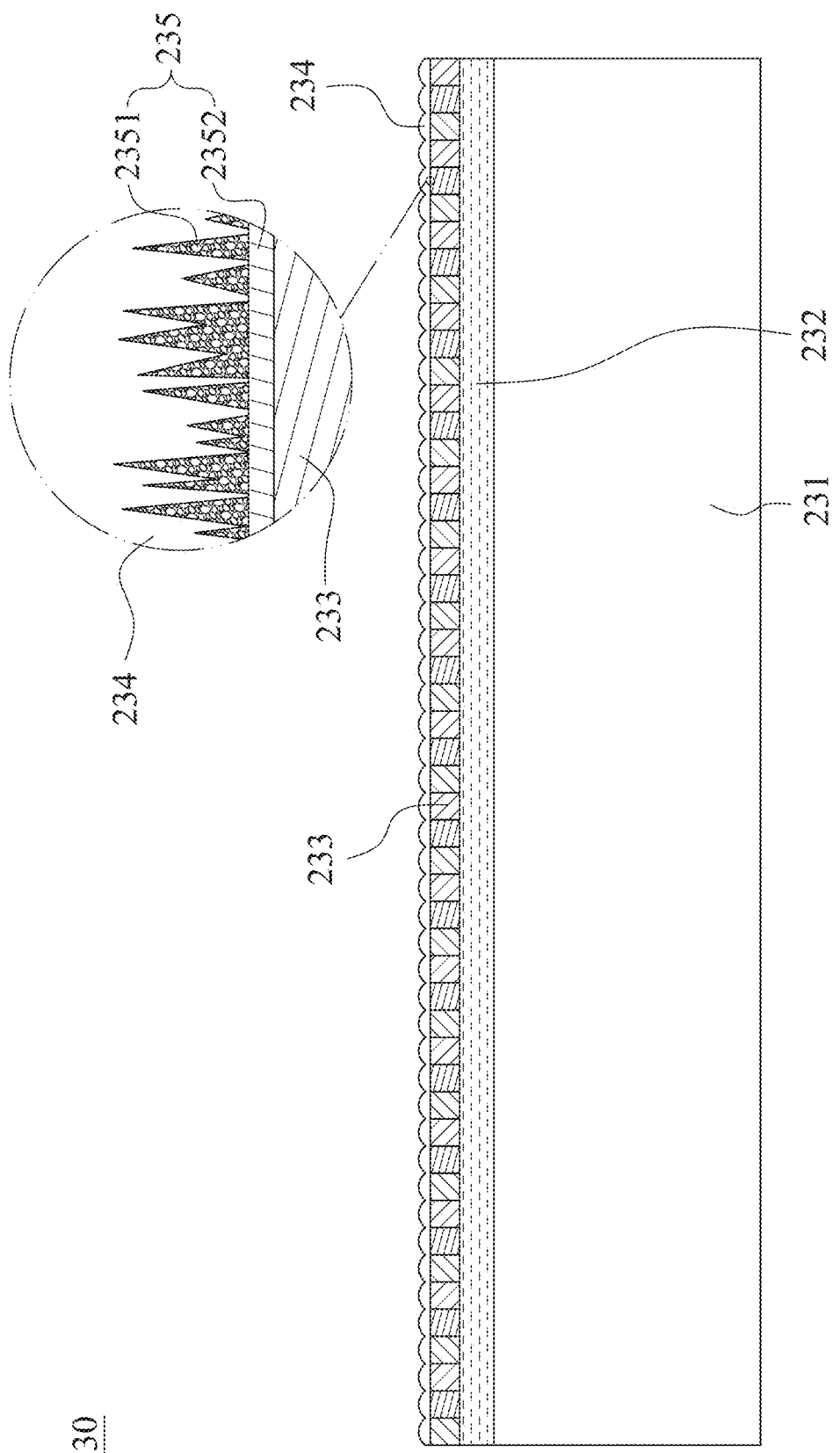
FIG. 3 shows a schematic view of an image sensor according to the 2nd example of the 1st embodiment in FIG. 1.

FIG. 3 shows a schematic view of an image sensor 230 according to the 2nd example of the 1st embodiment in FIG. 1. As shown in FIG. 3, in the 2nd example, the image sensor 230 includes a substrate 231, a photoelectric converting layer 232, a micro lens arrays layer 234, a light filtering layer 233 and an anti-reflecting layer 235. It has to be specified that the structure and the configuration of the substrate 231, the photoelectric converting layer 232, the light filtering layer 233 an the micro lens arrays layer 234 which are the same as the structure and the configuration of the substrate 131, the photoelectric converting layer 132, the light filtering layer 133 and the micro lens arrays layer 134 in the 1st example will not be described herein again.

The light filtering layer 233 is the two-dimensional array arranged by red, yellow and blue light filtering materials. Hence, the light filtering layer 233 can allow the light with the certain wavelength region to pass by.

The anti-reflecting layer 235 is disposed on a surface of at least one of the light filtering layer 233 and the micro lens arrays layer 234, wherein the anti-reflecting layer 235 includes an irregular nano-crystallite structure layer 2351 and an optical connecting layer 2352. The optical connecting layer 2352 is connected to the irregular nano-crystallite structure layer 2351. Specifically, the irregular nano-crystallite structure layer 2351 can be made of metal oxide; in the 2nd example, the irregular nano-crystallite structure layer 2351 is made of aluminum oxide. Moreover, the optical connecting layer 2352 can be made of silicon oxide. Hence, it is favorable for accelerating manufacturing process and mass production.

Specifically, the anti-reflecting layer 235 is disposed between the light filtering layer 233 and the micro lens arrays layer 234, and the optical connecting layer 2352 is disposed on an object-side surface of the light filtering layer 233. Hence, color vision of the light filtering layer can be improved.

In the 2nd example, when a material refractive index of the irregular nano-crystallite structure layer 2351 is Nc, a material refractive index of the optical connecting layer 2352 is Nf, a height of the irregular nano-crystallite structure layer 2351 is Hc, a film thickness of the optical connecting layer 2352 is Hf, a total height of the anti-reflecting layer 235 is H, a size of each of micro lens elements 2341 of the micro lens arrays layer 234 is Dp, and a number of micro lens elements 2341 of the micro lens arrays layer 234 is PN, the conditions related to the parameters can be satisfied as the following Table 2.

TABLE 2 the 2nd example of the 1st embodiment

| Nc | 1.67 | H (nm) | 322.6 |
| Nf | 1.52 | Dp(μm) | 1 |
| Hc (nm) | 247.4 | PN | 0.2 billion |
| Hf (nm) | 75.2 | | |

Figure 4:
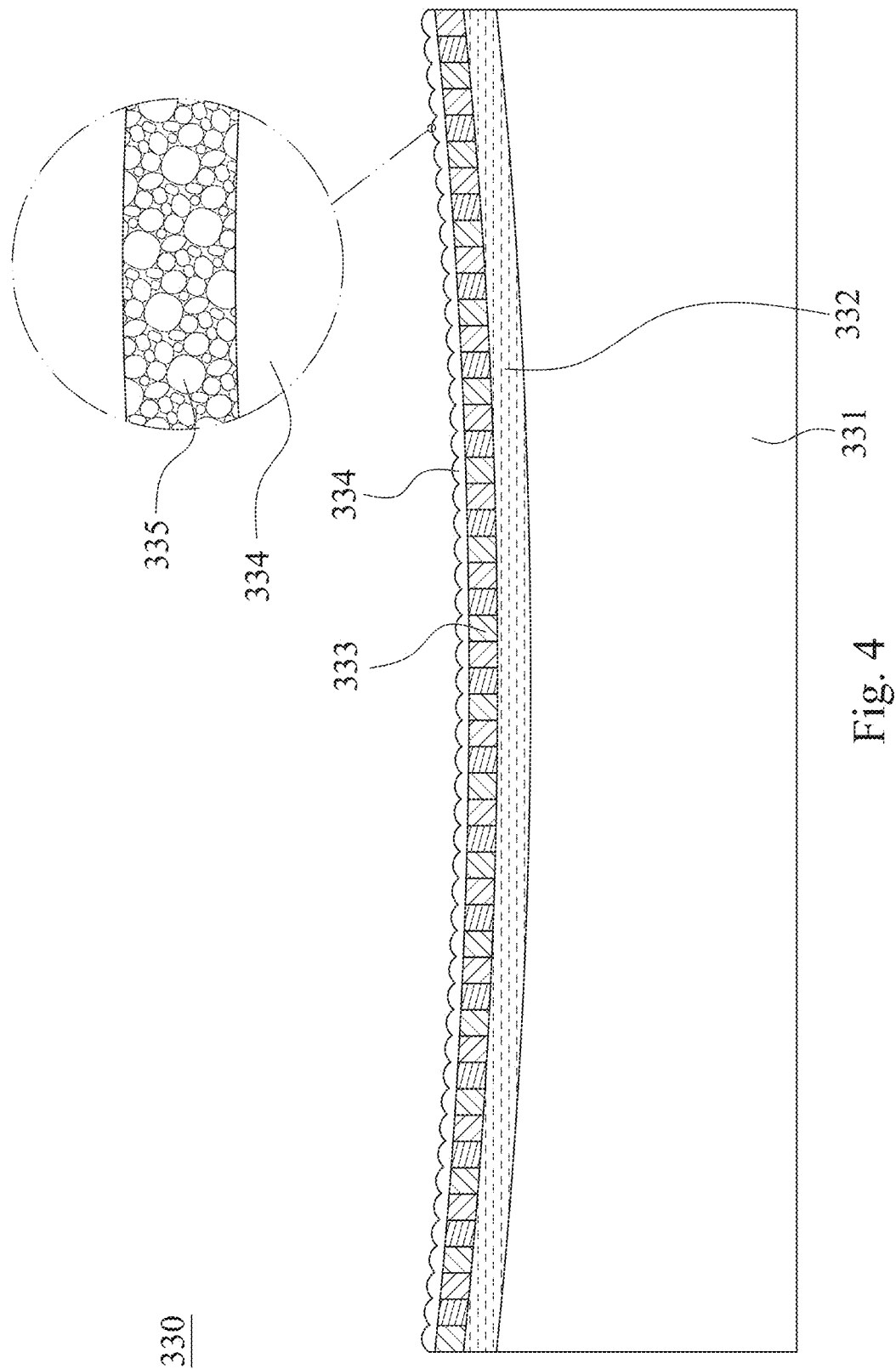
FIG. 4 shows a schematic view of an image sensor according to the 3rd example of the 1st embodiment in FIG. 1.

FIG. 4 shows a schematic view of an image sensor 330 according to the 3rd example of the 1st embodiment in FIG. 1. As shown in FIG. 4, in the 3rd example, the image sensor 330 includes a substrate 331, a photoelectric converting layer 332, a micro lens arrays layer 334, a light filtering layer 333 and an anti-reflecting layer (its reference numeral is omitted). It has to be specified that the structure and the configuration of the substrate 331, the photoelectric converting layer 332, the light filtering layer 333 and the micro lens arrays layer 334 which are the same as the structure and the configuration of the substrate 131, the photoelectric converting layer 132, the light filtering layer 133 and the micro lens arrays layer 134 in the 1st example will not be described herein again.

The light filtering layer 333 is the two-dimensional array arranged by red, green and blue light filtering materials. Hence, the light filtering layer 333 can allow the light with the certain wavelength region to pass by.

The anti-reflecting layer is disposed on a surface of at least one of the light filtering layer 333 and the micro lens arrays layer 334, wherein the anti-reflecting layer includes an irregular nano structure layer 335. The irregular nano structure layer 335 has a plurality of porous structures. Hence, the anti-reflecting layer can be formed by plasma etching. Specifically, the anti-reflecting layer is disposed on an object-side surface of the micro lens arrays layer 334. Hence, possibility of generation of non-imaging light from a large angle can be decreased.

In the 3rd example, an overall structure of the image sensor 330 is a curved structure. Specifically, an object-side surface of the image sensor 330 is a curved surface which is concave inward. When a size of each of micro lens elements of the micro lens arrays layer 334 is Dp, Dp=2.2 μm; when a number of micro lens elements of the micro lens arrays layer 334 is PN, PN=70 million.

Figure 5:
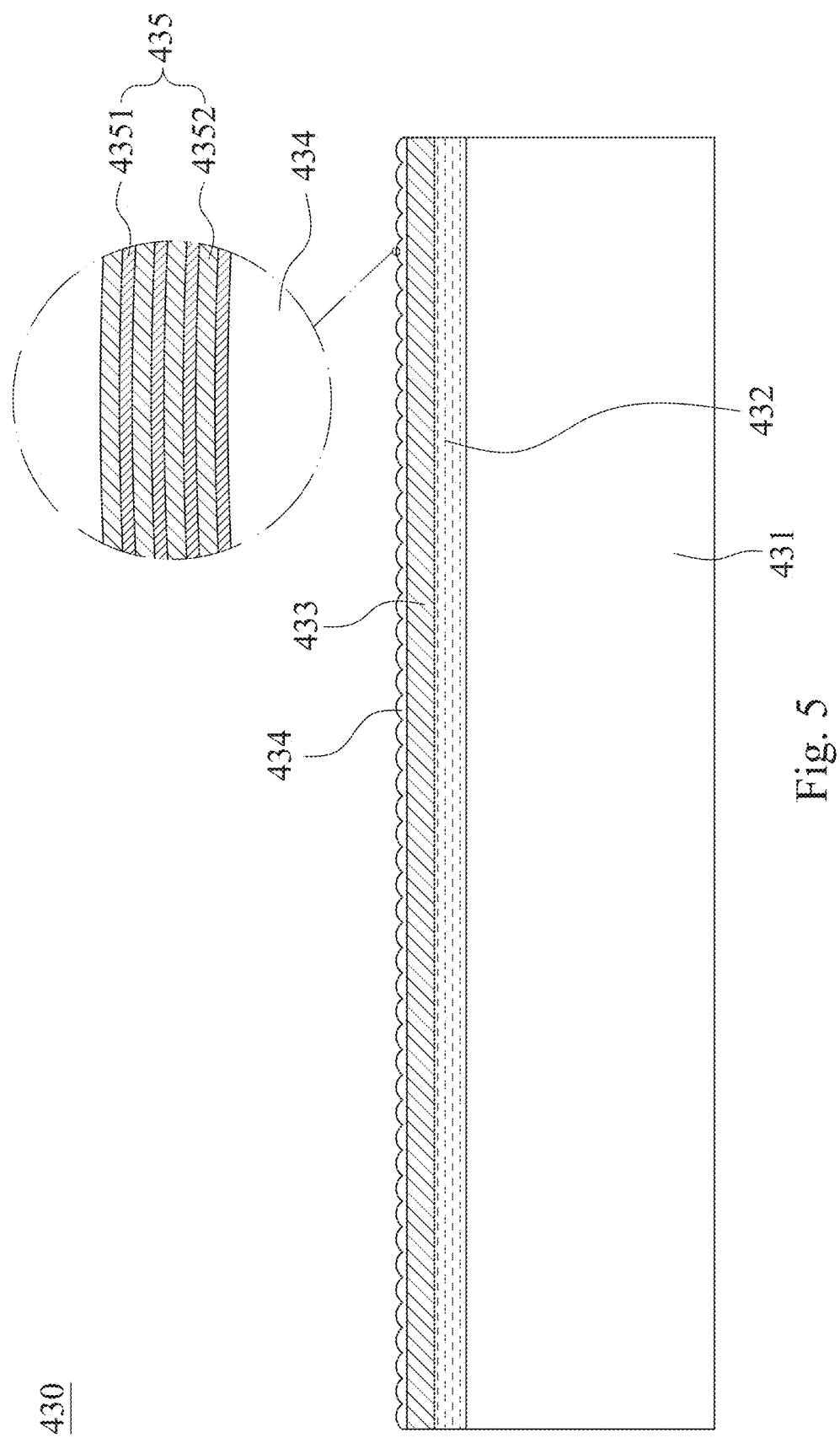
FIG. 5 shows a schematic view of an image sensor according to the 4th example of the 1st embodiment in FIG. 1.

FIG. 5 shows a schematic view of an image sensor 430 according to the 4th example of the 1st embodiment in FIG. 1. As shown in FIG. 5, in the 4th example, the image sensor 430 includes a substrate 431, a photoelectric converting layer 432, a micro lens arrays layer 434, a light filtering layer 433 and an anti-reflecting layer 435. It has to be specified that the structure and the configuration of the substrate 431, the photoelectric converting layer 432, the light filtering layer 433 and the micro lens arrays layer 434 which are the same as the structure and the configuration of the substrate 131, the photoelectric converting layer 132, the light filtering layer 133 and the micro lens arrays layer 134 in the 1st example will not be described herein again.

The light filtering layer 433 is the two-dimensional array arranged by infrared light filtering materials. Hence, the light filtering layer 433 can allow the light with the certain wavelength region to pass by.

The anti-reflecting layer 435 is disposed on a surface of at least one of the light filtering layer 433 and the micro lens arrays layer 434, wherein the anti-reflecting layer 435 includes an optical multi-membrane stacking structure (its reference numeral is omitted). A plurality of membrane layers 4351, 4352 are stacked alternately with high and low material refractive index differences to form the optical multi-membrane stacking structure, and the membrane layers 4351, 4352 are stacked alternately with high and low material refractive index differences at least three times. In detail, the membrane layers 4351 are the membrane layers with high material refractive index differences, the membrane layers 4352 are the membrane layers with low material refractive index differences, and a number of times of stacking is a number of interfaces formed between each of the membrane layers 4351 and each of the membrane layers 4352. Specifically, the membrane layers 4351 with high material refractive index differences are made of aluminum oxide, the membrane layers 4352 with low material refractive index differences are made of silicon oxide, but the present disclosure is not limited thereto. In the 4th example, the membrane layers 4351, 4352 are stacked alternately with high and low material refractive index differences seven times. Hence, the anti-reflecting layer 435 can be formed by CVD or PVD.

In the 4th example, when a size of each of micro lens elements of the micro lens arrays layer 434 is Dp, Dp=1.7 µm; when a number of micro lens elements of the micro lens arrays layer 434 is PN, PN=8 million.

2nd Embodiment

Figure 6:
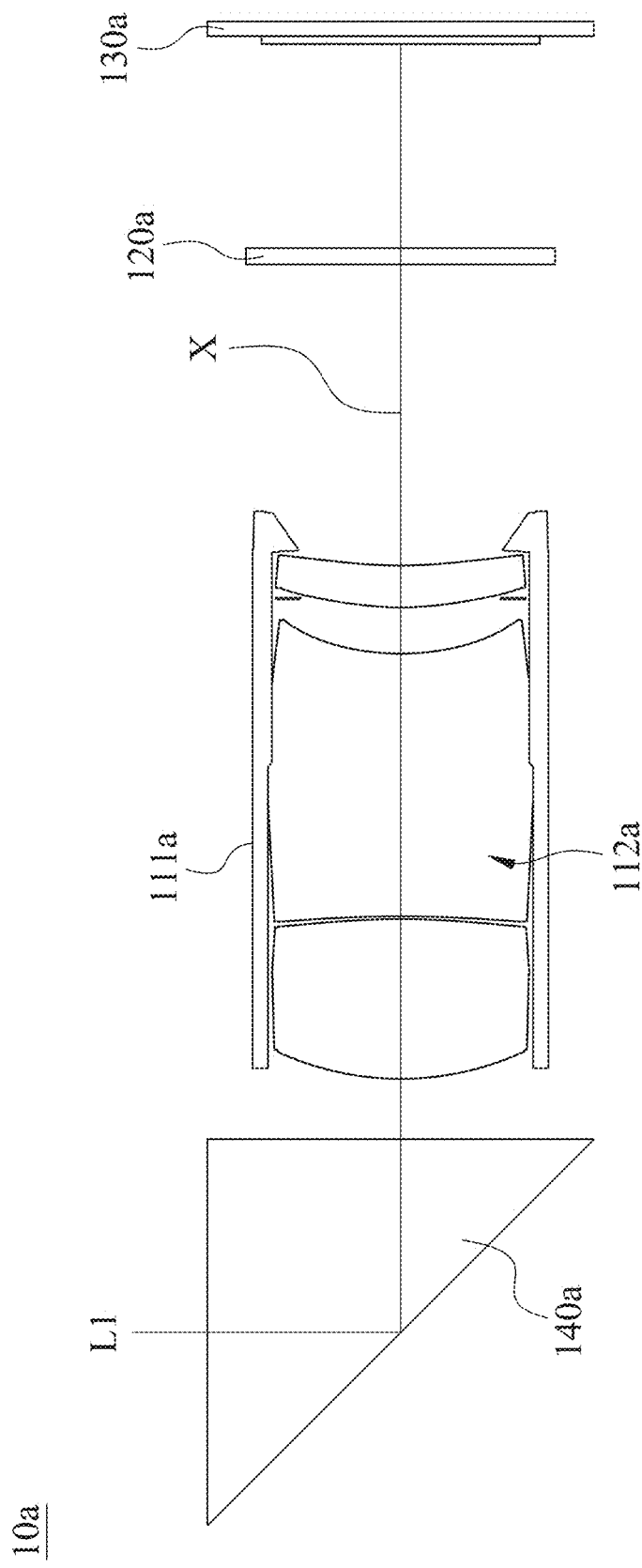
FIG. 6 shows a schematic view of a camera module according to the 2nd embodiment of the present disclosure.

FIG. 6 shows a schematic view of a camera module 10a according to the 2nd embodiment of the present disclosure. As shown in FIG. 6, the camera module 10a includes an imaging lens assembly module (its reference numeral is omitted), an optical plate 120a, an image sensor 130a and a light folding element 140a. The imaging lens assembly module has an optical axis X. The optical plate 120a is disposed between the imaging lens assembly module and the image sensor 130a. The image sensor 130a is disposed on an image surface (not shown) of the imaging lens assembly module, the image sensor 130a can be any of the aforementioned image sensors 130, 230, 330, 430 according to the 1st, 2nd, 3rd and 4th example of the 1st embodiment, but the present disclosure is not limited thereto. The light folding element 140a is disposed on an object-side surface of the imaging lens assembly module and for folding a light path L1 of an imaging light to the optical axis X. When the imaging light enters the camera module, the image sensor with the anti-reflecting layer can remove stray light effectively in the camera module so as to improve light-gathering ability. Moreover, transmittance of the light filtering layer and color rendition of the image sensor can be improved.

Specifically, the imaging lens assembly module can include a lens barrel 111a and a plurality of lens elements 112a. The lens elements 112a are disposed in the lens barrel 111a, and arranged in order from an object side of the imaging lens assembly module to an image side thereof. Moreover, other optical elements such as a light blocking sheet, a spacer, a retainer and etc. can be disposed in the lens barrel 111a on demand, but it will not be described herein. Via the configuration of the imaging lens assembly module, the optical plate 120a, the image sensor 130a and the light folding element 140a, the camera module 10a can capture an image far away and magnify the image to high magnification so as to achieve the function of the telephoto camera.

3rd Embodiment

Figure 7:
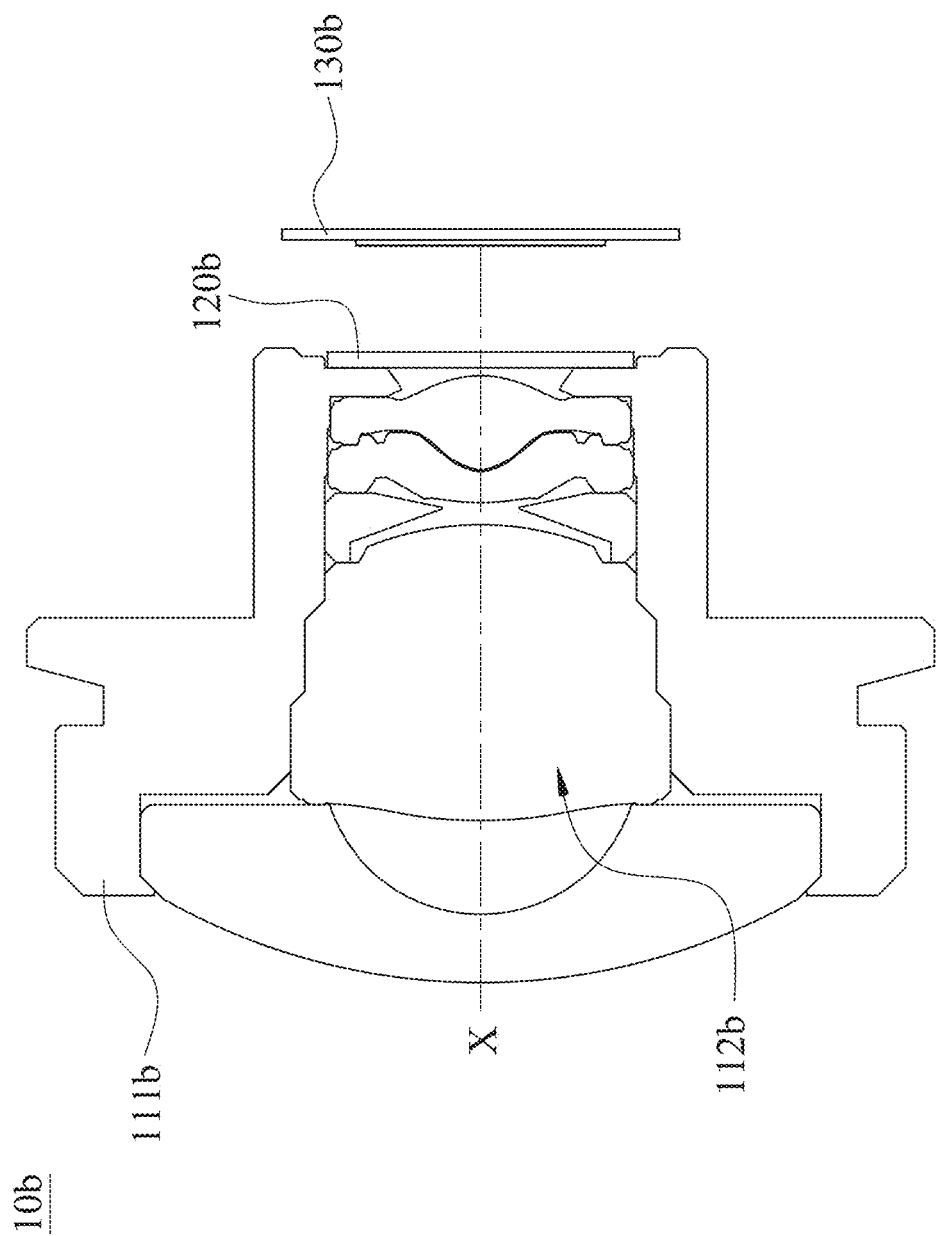
FIG. 7 shows a schematic view of a camera module according to the 3rd embodiment of the present disclosure.

FIG. 7 shows a schematic view of a camera module 10b according to the 3rd embodiment of the present disclosure. As shown in FIG. 7, the camera module 10b includes an imaging lens assembly module (its reference numeral is omitted), an optical plate 120b and an image sensor 130b. The imaging lens assembly module has an optical axis X. The optical plate 120b is disposed between the imaging lens assembly module and the image sensor 130b. The image sensor 130b is disposed on an image surface (not shown) of the imaging lens assembly module, the image sensor 130b can be any of the aforementioned image sensors 130, 230, 330, 430 according to the 1st, 2nd, 3rd and 4th example of the 1st embodiment, but the present disclosure is not limited thereto. When the imaging light enters the camera module, the image sensor with the anti-reflecting layer can remove stray light effectively in the camera module so as to improve light-gathering ability. Moreover, transmittance of the light filtering layer and color rendition of the image sensor can be improved.

Specifically, the imaging lens assembly module can include a lens barrel 111b and a plurality of lens elements 112b. The lens elements 112b are disposed in the lens barrel 111b, and arranged in order from an object side of the imaging lens assembly module to an image side thereof. Moreover, other optical elements such as a light blocking sheet, a spacer, a retainer and etc. can be disposed in the lens barrel 111b on demand, but it will not be described herein. Via the configuration of the imaging lens assembly module, the optical plate 120b and the image sensor 130b, the camera module 10b can be applied for a vehicle instrument.

4th Embodiment

Figure 8A:
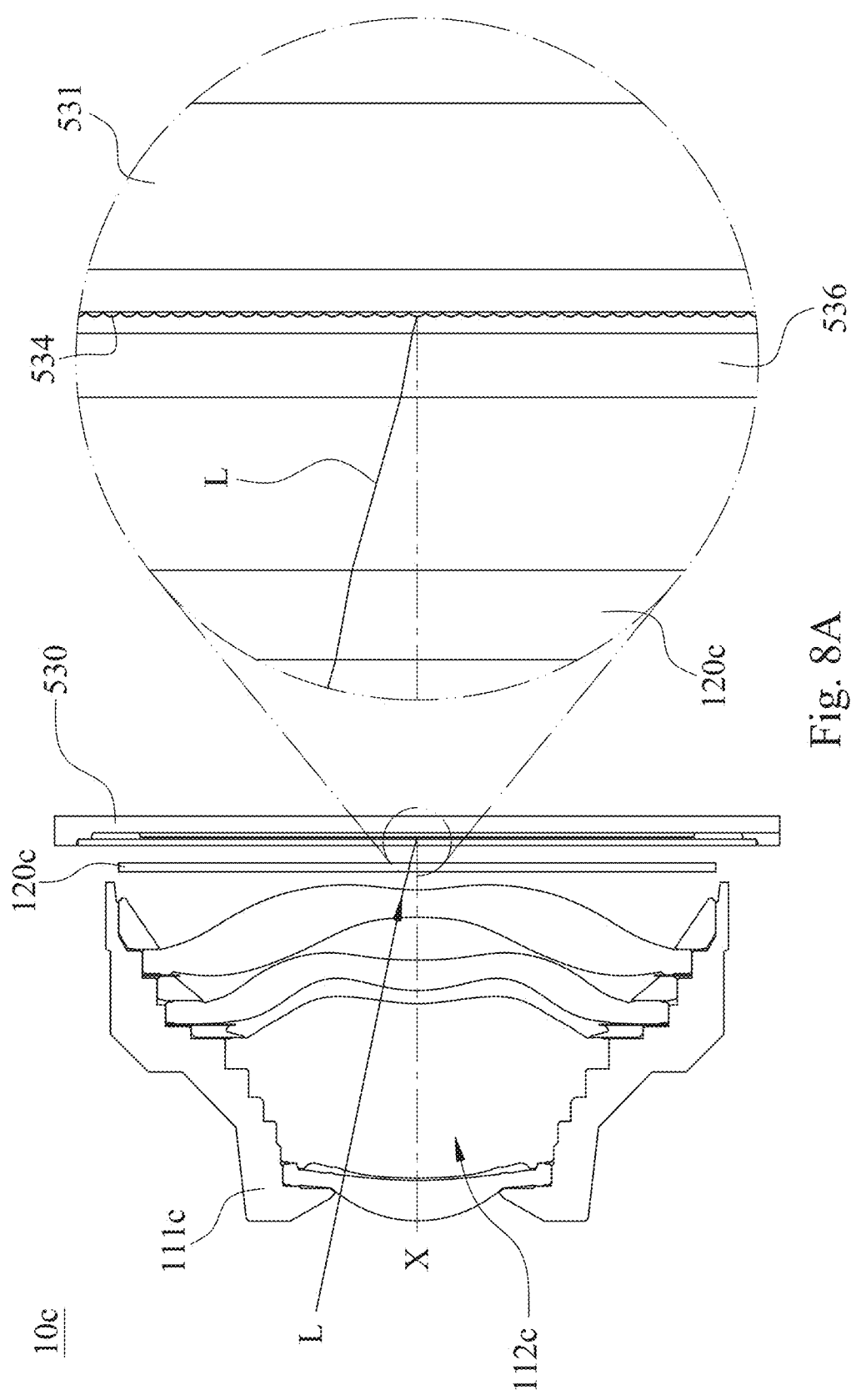
FIG. 8A shows a schematic view of a camera module according to the 4th embodiment of the present disclosure.

FIG. 8A shows a schematic view of a camera module 10c according to the 4th embodiment of the present disclosure. As shown in FIG. 8A, the camera module 10c includes an imaging lens assembly module (its reference numeral is omitted), an optical plate 120c and an image sensor 530. The imaging lens assembly module has an optical axis X. The optical plate 120c is disposed between the imaging lens assembly module and the image sensor 530. The image sensor 530 is disposed on an image surface (not shown) of the imaging lens assembly module, and the image sensor 530 includes a substrate 531, a photoelectric converting layer 532 (shown in FIG. 8B), a micro lens arrays layer 534, a light filtering layer 533 (shown in FIG. 8B), a cover glass 536 and two anti-reflecting layers 535, 537 (shown in FIG. 8B). The photoelectric converting layer 532 is disposed on an object-side surface of the substrate 531. The photoelectric converting layer 532 is for converting a light signal of an imaging light L to an electric signal. The micro lens arrays layer 534 is for converging an energy of the imaging light L into the photoelectric converting layer 532. The light filtering layer 533 is disposed between the photoelectric converting layer 532 and the micro lens arrays layer 534, and the light filtering layer 533 is for absorbing a light at a certain wavelength region of the imaging light L. An inner space layer 5341 (shown in FIG. 8B) is formed between the cover glass 536 and the micro lens arrays layer 534, and the inner space layer 5341 is isolated from an outer space of the image sensor 530. When the imaging light enters the camera module, the image sensor with the anti-reflecting layer can remove stray light effectively in the camera module so as to improve light-gathering ability. Moreover, transmittance of the light filtering layer and color rendition of the image sensor can be improved.

Specifically, the imaging lens assembly module can include a lens barrel 111c and a plurality of lens elements 112c. The lens elements 112c are disposed in the lens barrel 111c, and arranged in order from an object side of the imaging lens assembly module to an image side thereof. Moreover, other optical elements such as a light blocking sheet, a spacer, a retainer and etc. can be disposed in the lens barrel 111c according on demand, but it will not be described herein.

Figure 8B:
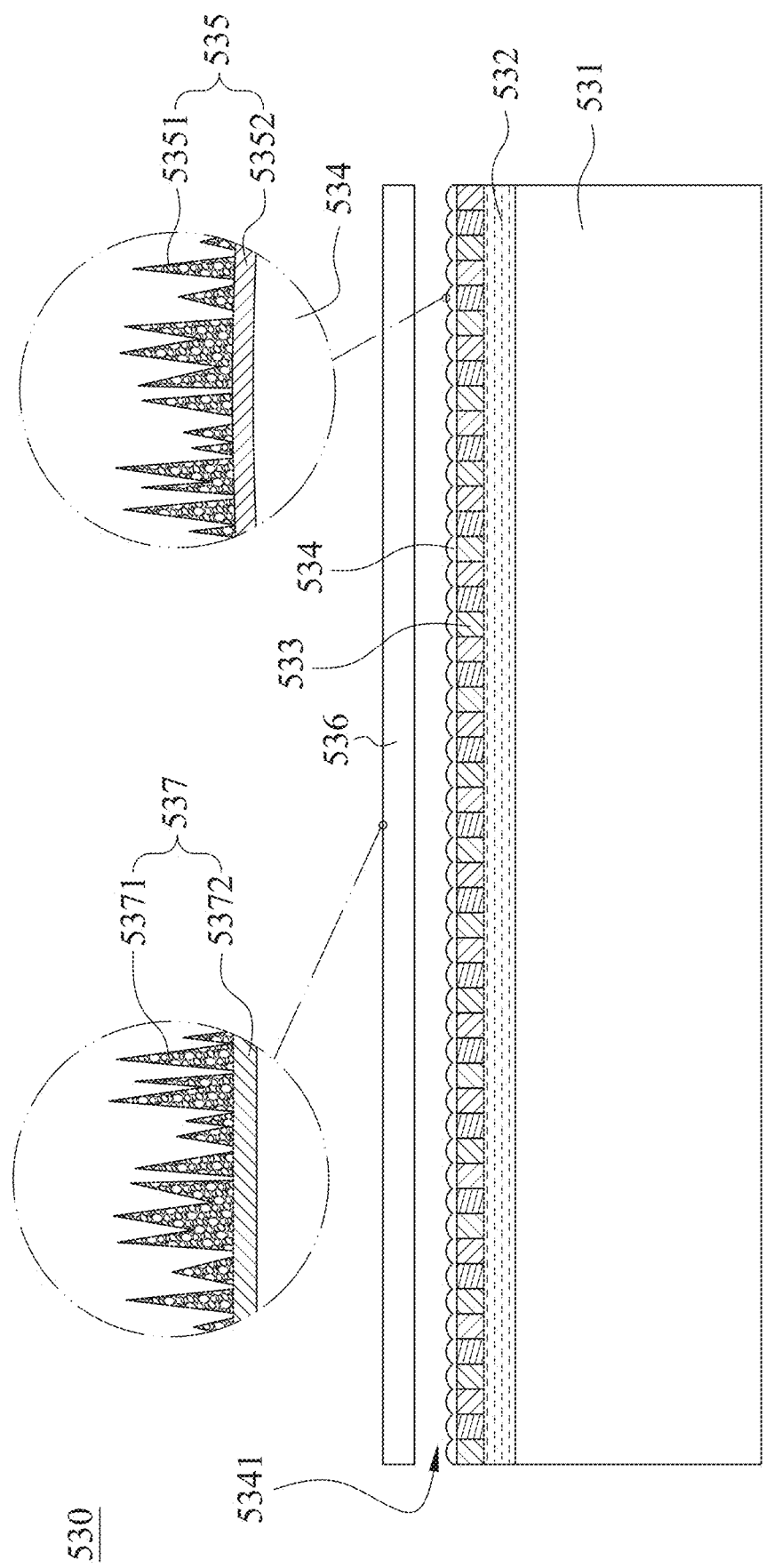
FIG. 8B shows a schematic view of the image sensor according to the 4th embodiment in FIG. 8A.

FIG. 8B shows a schematic view of the image sensor 530 according to the 4th embodiment in FIG. 8A. As shown in FIG. 8B, the anti-reflecting layer 535 is disposed on an object-side surface of the micro lens arrays layer 534. The anti-reflecting layer 537 is disposed on at least one surface of the cover glass 536. The anti-reflecting layer 535 includes an irregular nano-crystallite structure layer 5351 and an optical connecting layer 5352. The anti-reflecting layer 537 includes an irregular nano-crystallite structure layer 5371 and an optical connecting layer 5372. The optical connecting layers 5352, 5372 are connected to the irregular nano-crystallite structure layers 5351, 5371, respectively.

Specifically, the irregular nano-crystallite structure layers 5351, 5371 can be made of metal oxide; in the 4th embodiment, the irregular nano-crystallite structure layers 5351, 5371 can be made of aluminum oxide. Moreover, the optical connecting layers 5352, 5372 can be made of silicon oxide. Hence, it is favorable for accelerating manufacturing process and mass production.

Moreover, the cover glass 536 includes an object-side surface and an image-side surface, and the anti-reflecting layer 537 is disposed on the object-side surface and the image-side surface of the cover glass 536. Hence, the reflection on the surfaces of the cover glass 536 and the secondary reflection in the cover glass 536 can be effectively reduced.

In the 4th embodiment, the cover glass 536 can be a plate glass. The plate glass and a photosensitive chip can be assembled to the substrate 531 to form the image sensor 530, the substrate 531 can be a circuit substrate, but the present disclosure is not limited thereto.

The light filtering layer 533 is the two-dimensional array arranged by red, green and blue light filtering materials. Hence, the light filtering layer 533 can allow the light with the certain wavelength region to pass by.

In the 4th embodiment, when a material refractive index of the irregular nano-crystallite structure layers 5351, 5371 is Nc, a material refractive index of the optical connecting layers 5352, 5372 is Nf, a height of the irregular nano-crystallite structure layers 5351, 5371 is Hc, a film thickness of the optical connecting layers 5352, 5372 is Hf, a total height of the anti-reflecting layer 535 is H, a size of each of micro lens elements of the micro lens arrays layer 534 is Dp, and a number of micro lens elements of the micro lens arrays layer 534 is PN, the conditions related to the parameters can be satisfied as the following Table 3.

TABLE 3

| the 4th embodiment | | | |
|---|---|---|---|
| Nc | 1.67 | H (nm) | 322.6 |
| Nf | 1.52 | Dp(μm) | 2.4 |
| Hc (nm) | 247.4 | PN | 0.1 billion |
| Hf (nm) | 75.2 | | |

5th Embodiment

Figure 9:
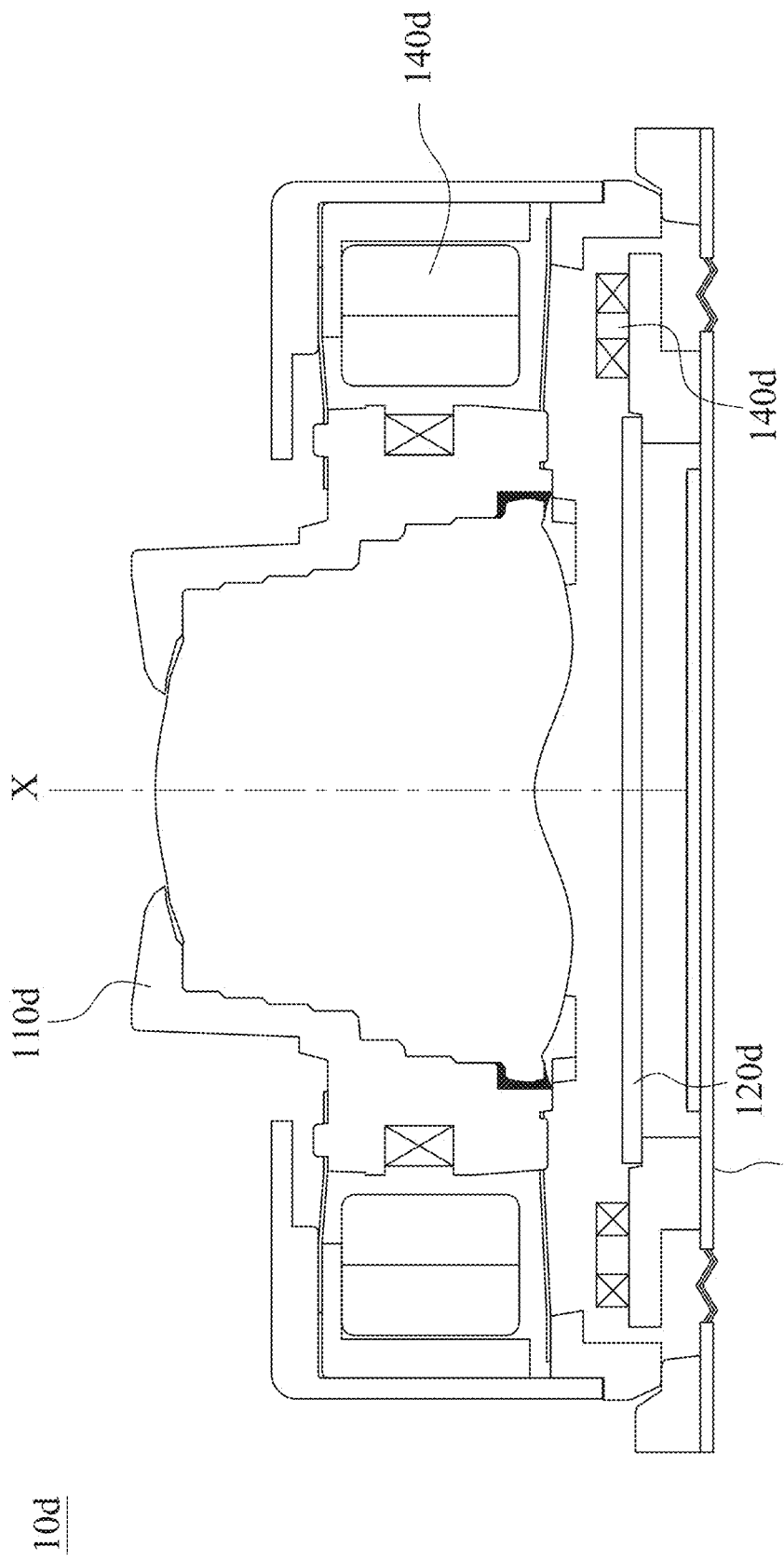
FIG. 9 shows a schematic view of a camera module according to the 5th embodiment of the present disclosure.

FIG. 9 shows a schematic view of a camera module 10d according to the 5th embodiment of the present disclosure. As shown in FIG. 9, the camera module 10d includes an imaging lens assembly module 110d, an optical plate 120d, an image sensor 130d and four driving devices 140d. The imaging lens assembly module 110d has an optical axis X. The optical plate 120d is disposed between the imaging lens assembly module 110d and the image sensor 130d. The image sensor 130d is disposed on an image surface (not shown) of the imaging lens assembly module 110d, the image sensor 130d can be any of the aforementioned image sensors 130, 230, 330, 430 according to the 1st, 2nd, 3rd and 4th example of the 1st embodiment, but the present disclosure is not limited thereto. The driving devices 140d are driving the image sensor 130d. Via the configuration of the driving devices 140d, the driving ability of image stabilization can be provided on the image sensor 130d. Hence, the function of image stability of the image sensor 130d can be obtained.

6th Embodiment

Figure 10A:
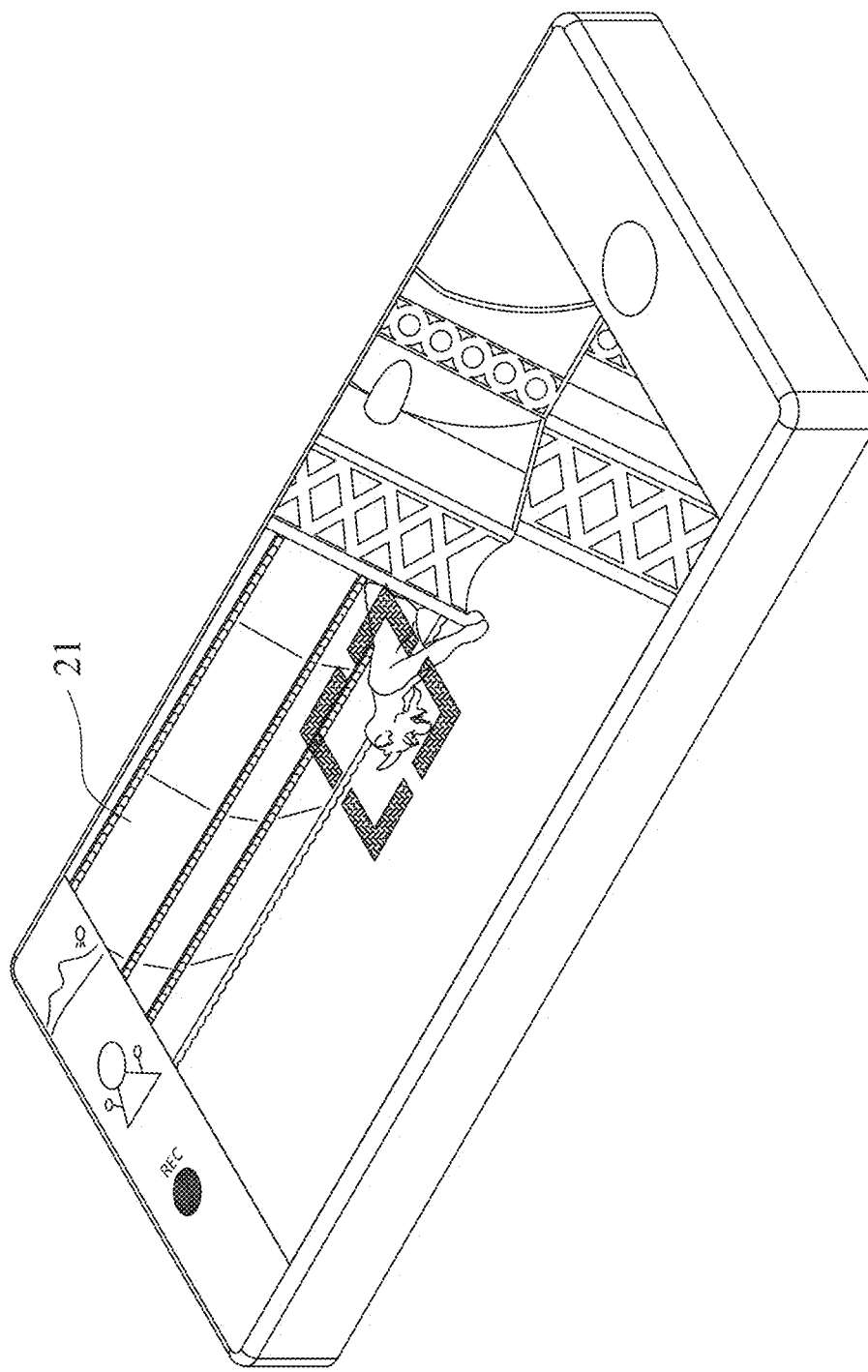
FIG. 10A shows a schematic view of an electronic device according to the 6th embodiment of the present disclosure.
Figure 10B:
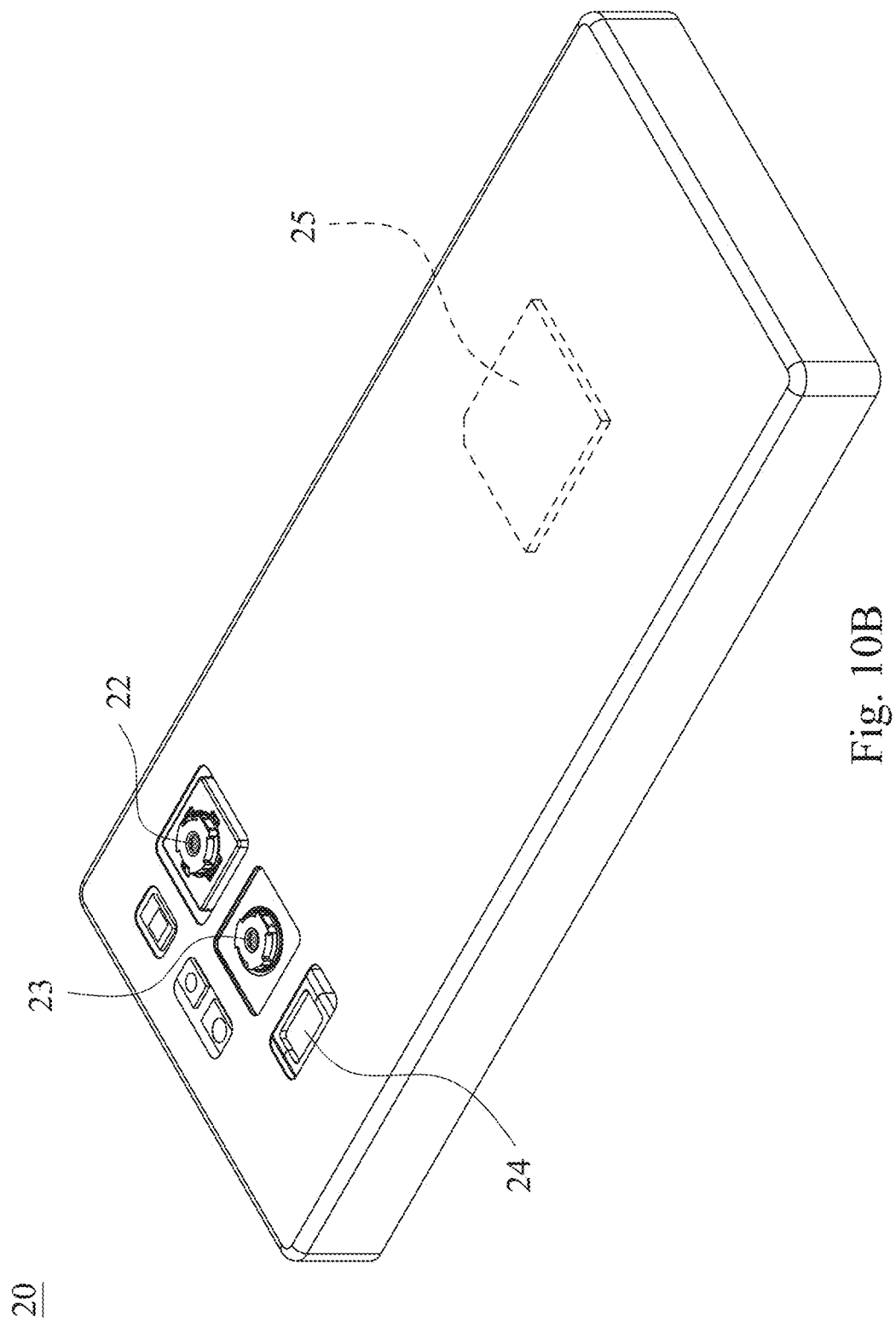
FIG. 10B shows another schematic view of the electronic device according to the 6th embodiment in FIG. 10A.

FIG. 10A shows a schematic view of an electronic device 20 according to the 6th embodiment of the present disclosure. FIG. 10B shows another schematic view of the electronic device 20 according to the 6th embodiment in FIG. 10A. In FIGS. 10A and 10B, the electronic device 20 according to the 6th embodiment is a smartphone, the electronic device 20 includes at least one camera module. In the 6th embodiment, a number camera module is three, wherein the three camera modules are an ultra-wide angle camera module 22, a high-pixel camera module 223 and a telephoto camera module 24, respectively. Furthermore, the camera modules can be any one according to the 1st embodiment to the 5th embodiment, but the present disclosure is not limited thereto. Hence, it is favorable for fulfilling a mass production and an appearance requirement of a camera module in the recent market of electronic devices.

Furthermore, the user can activate the capturing mode by a user interface 21 of the electronic device 20 wherein the user interface 21 according to the 6th embodiment can be a touch screen for displaying a screen and having a touch function, and the user interface 21 can be for manually adjusting field of view to switch the different camera modules. At this moment, the imaging lens assembly module of the camera module collects an imaging light on the image sensor and outputs electronic signals associated with images to an image signal processor (ISP) 25.

Furthermore, the electronic device 20 can further include, but not be limited to, a display, a control unit, a storage unit, a random-access memory (RAM), a read-only memory (ROM), or the combination thereof.

FIG. 10C shows a schematic view of an image captured by the ultra-wide angle camera module 22 according to the 6th embodiment in FIG. 10A. In FIG. 10C, a larger ranged image can be captured via the ultra-wide angle camera module 22, and the ultra-wide angle camera module 22 has a function for containing more views.

Figure 10D:
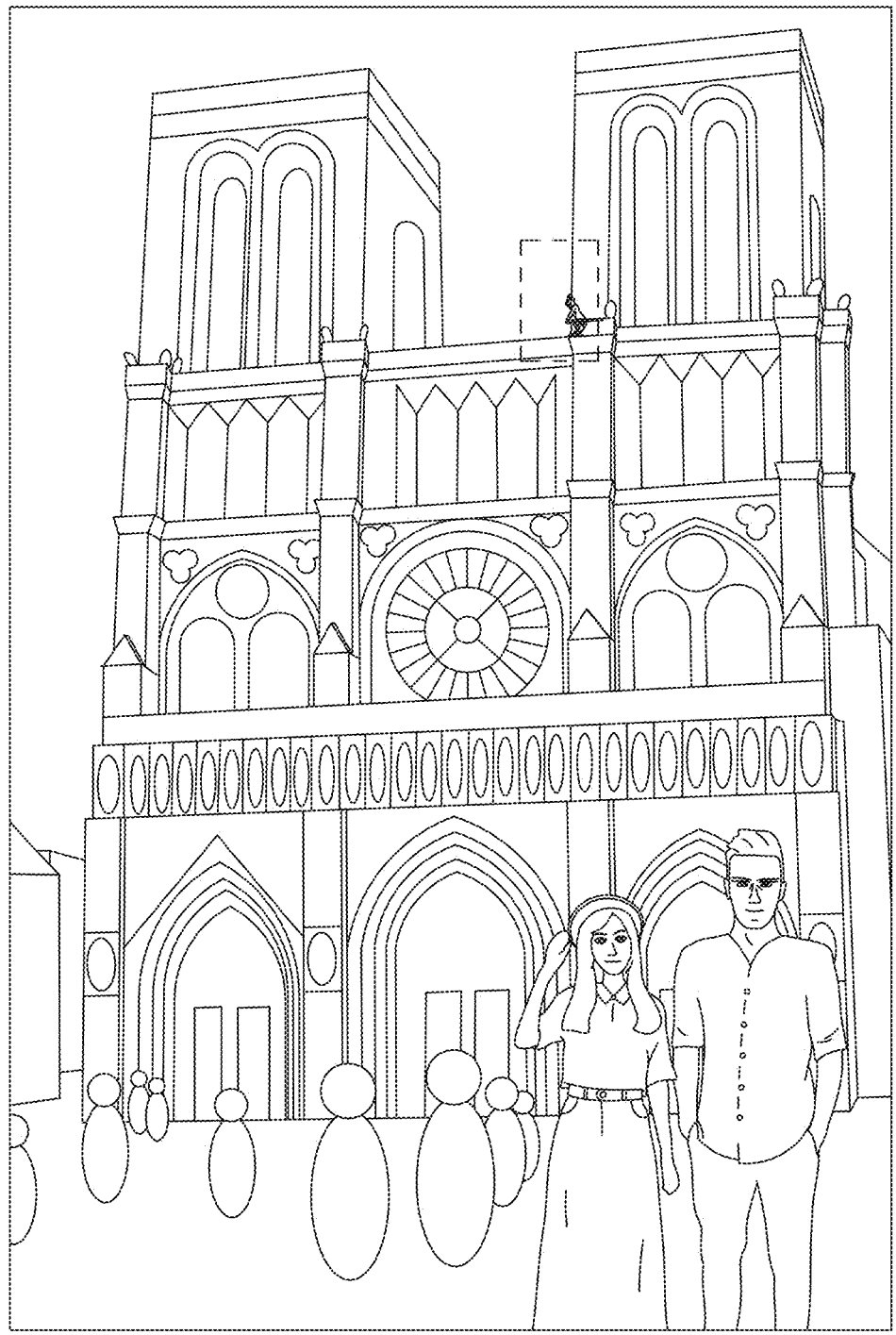
FIG. 10D shows a schematic view of an image captured by the high-pixel camera module according to the 6th embodiment in FIG. 10A.

FIG. 10D shows a schematic view of an image captured by the high-pixel camera module 23 according to the 6th embodiment in FIG. 10A. In FIG. 10D, a certain ranged and high-pixel image can be captured via the high-pixel camera module 23, and the high-pixel camera module 23 has a function for high resolution and low distortion.

Figure 10E:
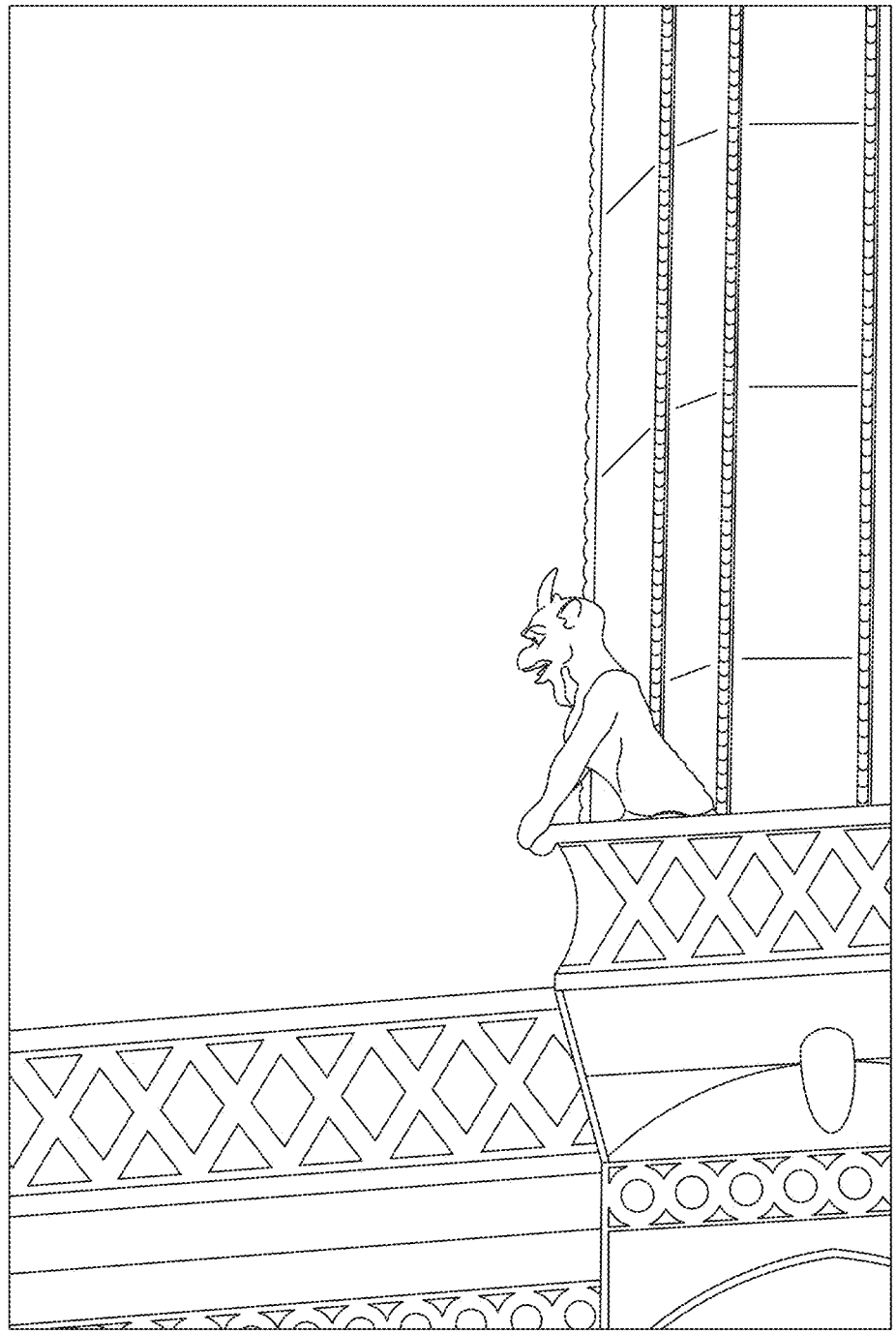
FIG. 10E shows a schematic view of an image captured by the telephoto camera module according to the 6th embodiment in FIG. 10A.

FIG. 10E shows a schematic view of an image captured by the telephoto camera module 24 according to the 6th embodiment in FIG. 10A. In FIG. 10E, a far image can be captured and enlarged to a high magnification via the telephoto camera module 24, and the telephoto camera module 24 has a function for a high magnification.

In FIGS. 10C to 10E, when an image is captured via the camera module having various focal lengths and processed via a technology of an image processing, a zoom function of the electronic device 20 can be achieved.

7th Embodiment

Figure 11:
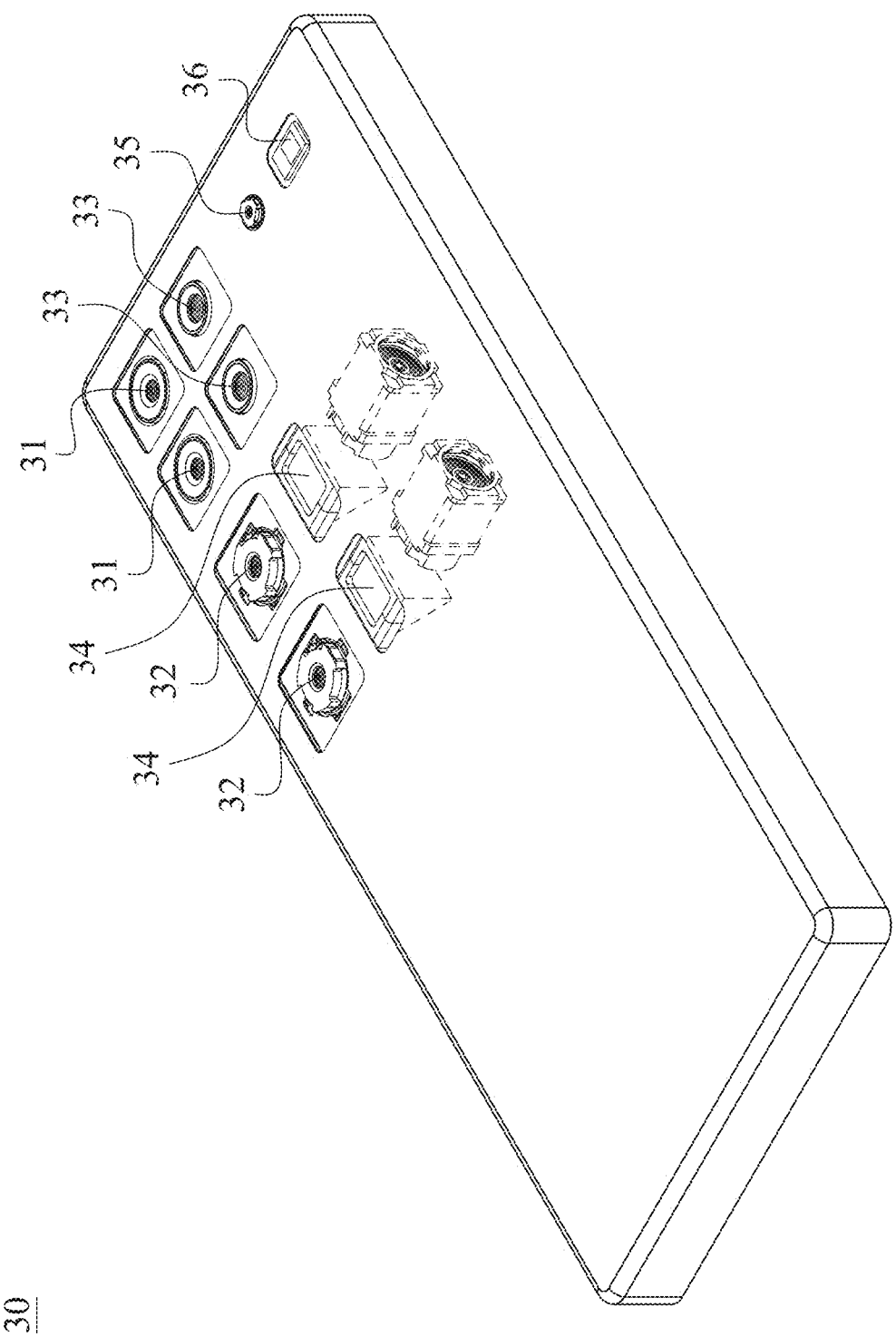
FIG. 11 shows a schematic view of an electronic device according to the 7th embodiment of the present disclosure.

FIG. 11 shows a schematic view of an electronic device 30 according to the 7th embodiment of the present disclosure. In FIG. 11, the electronic device 30 according to the 7th embodiment is a smartphone, and the electronic device 30 includes at least one camera module. In the 7th embodiment, a number camera module is nine, wherein the three camera modules are two ultra-wide angle camera modules 31, two wide angle camera modules 32, two high-pixel camera modules 33, two telephoto camera modules 34 and a time-of-flight (TOF) module 35, respectively. Furthermore, the camera modules can be any one according to the 1st embodiment to the 5th embodiment, but the present disclosure is not limited thereto. Hence, it is favorable for fulfilling a mass production and an appearance requirement of a camera module in the recent market of electronic devices.

According to the specification of the electronic device 30, the electronic device 30 can further include at least one auxiliary element (not shown). In the 7th embodiment, the auxiliary element is a flash module 36. The flash module 36 is for compensating the color temperature. Hence, the camera module of the present disclosure can provide the better image capturing experience.

8th Embodiment

Figure 12A:
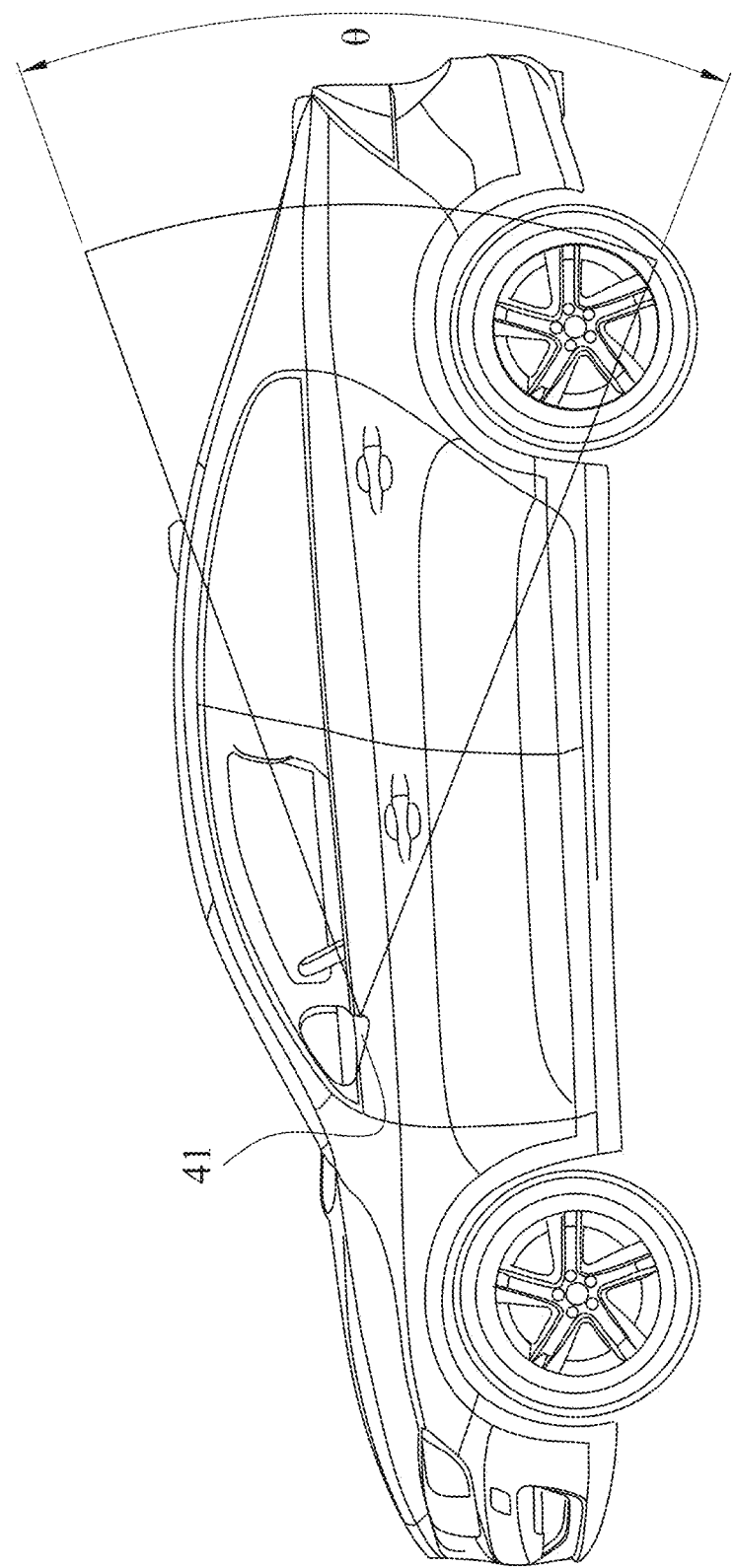
FIG. 12A shows a schematic view of a vehicle instrument according to the 8th embodiment of the present disclosure.

FIG. 12A shows a schematic view of a vehicle instrument 40 according to the 8th embodiment of the present disclosure. As shown in FIG. 12A, the vehicle instrument 40 includes a plurality of camera modules 41. The camera modules 41 can be any one according to the 1st embodiment to the 5th embodiment, but the present disclosure is not limited thereto.

In the 8th embodiment, two of the camera modules 41 are located under two rear view mirrors on left and right side, respectively. The two camera modules 41 capture image information from a field of view θ. Specifically, the field of view θ can satisfy the following condition: 40 degrees<θ<90 degrees. Hence, the image information in the regions of two lanes on left and right side can be captured.

Figure 12C:
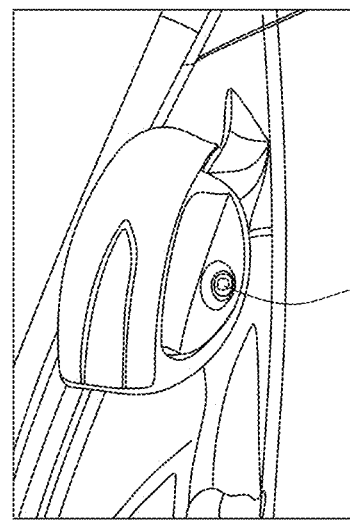
FIG. 12C shows a partial enlarged view of the vehicle instrument according to the 8th embodiment in FIG. 12B.
Figure 12B:
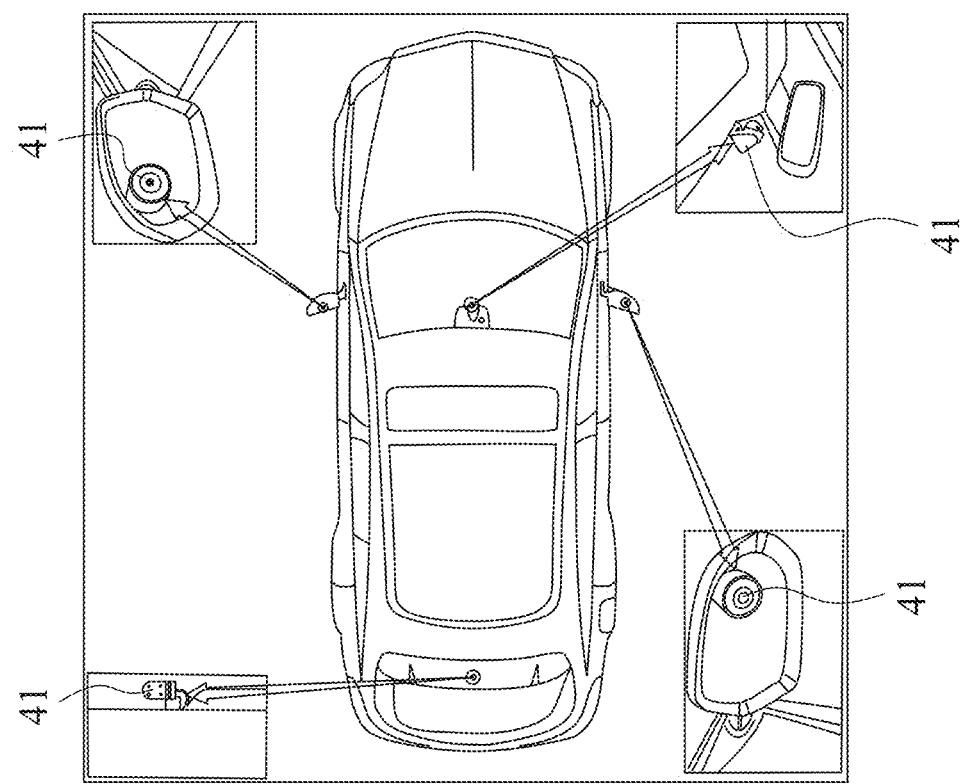
FIG. 12B shows a top view of the vehicle instrument according to the 8th embodiment in FIG. 12A.
Figure 12D:
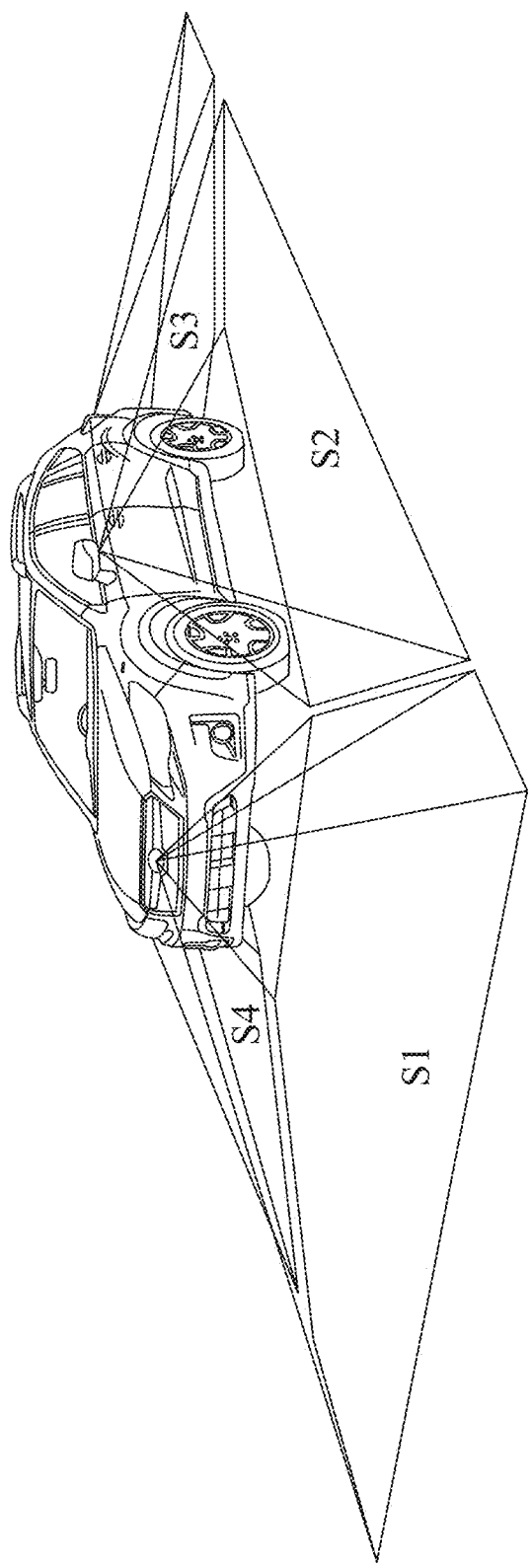
FIG. 12D shows another schematic view of the vehicle instrument according to the 8th embodiment in FIG. 12A.
Figure 13A:
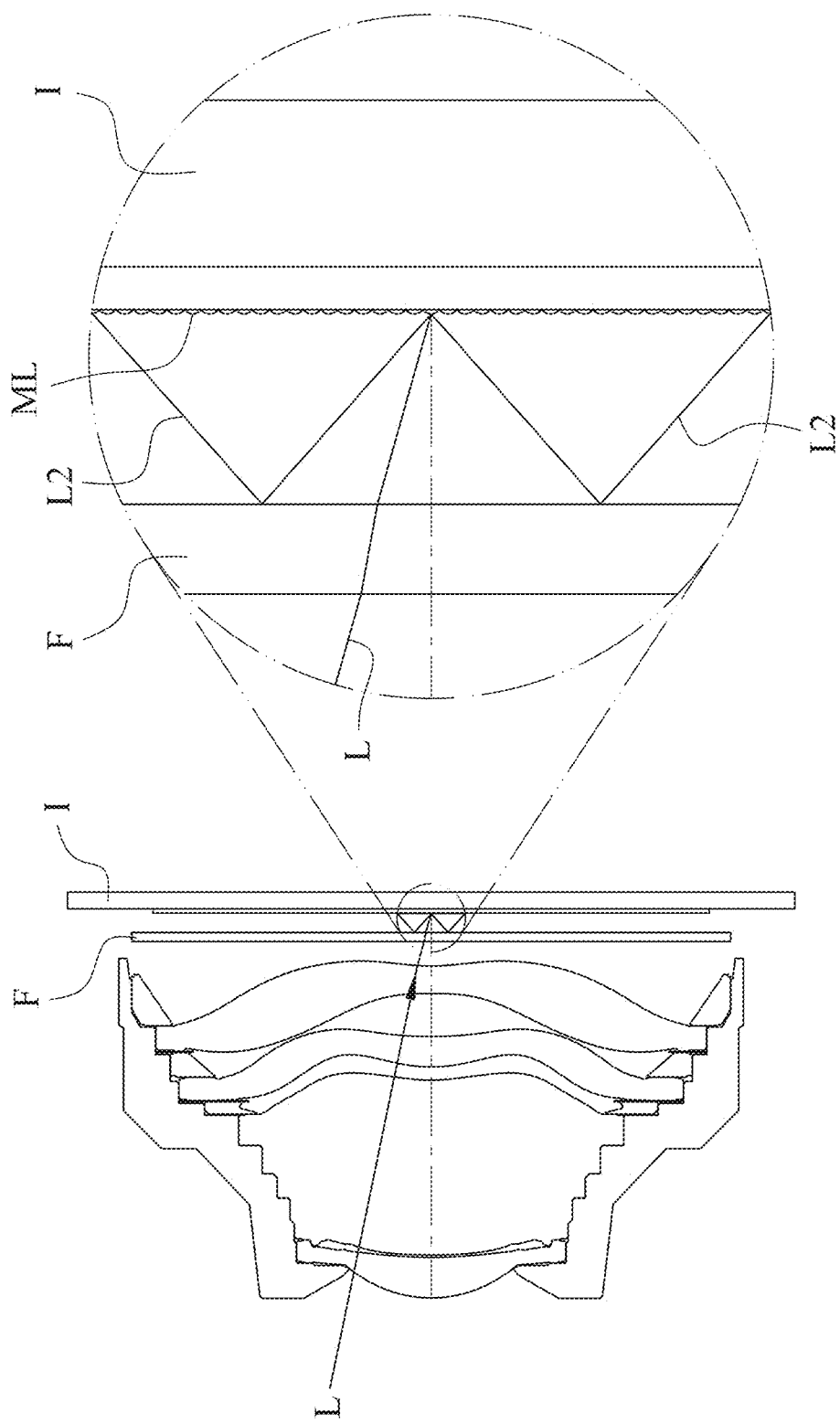
FIG. 13A shows a schematic view of a camera module according to the prior art.
Figure 13B:
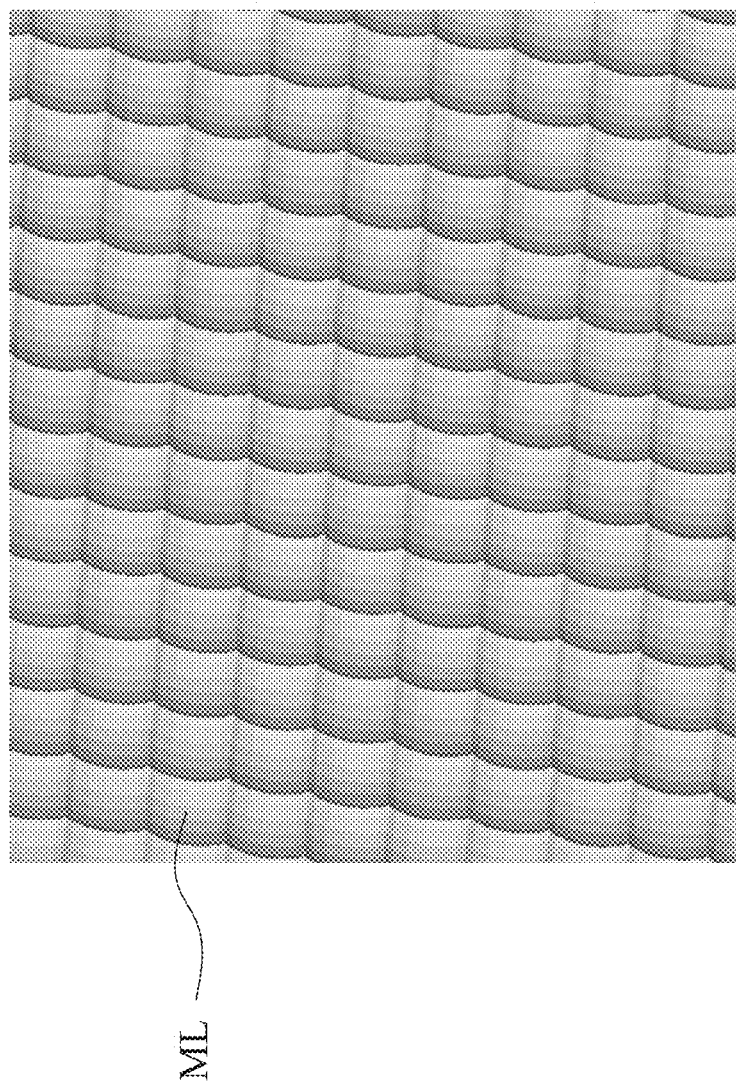
FIG. 13B shows a picture of the micro lens arrays layer of the camera module in FIG. 13A.
Figure 13C:
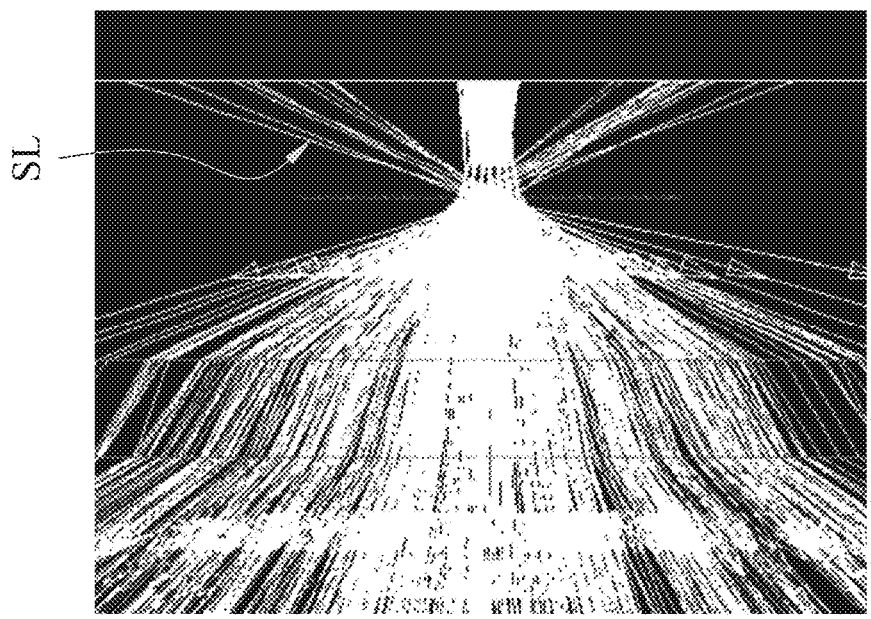
FIG. 13C shows a picture of stray light generated by the micro lens arrays layer of the camera module in FIG. 13A.
Figure 13D:
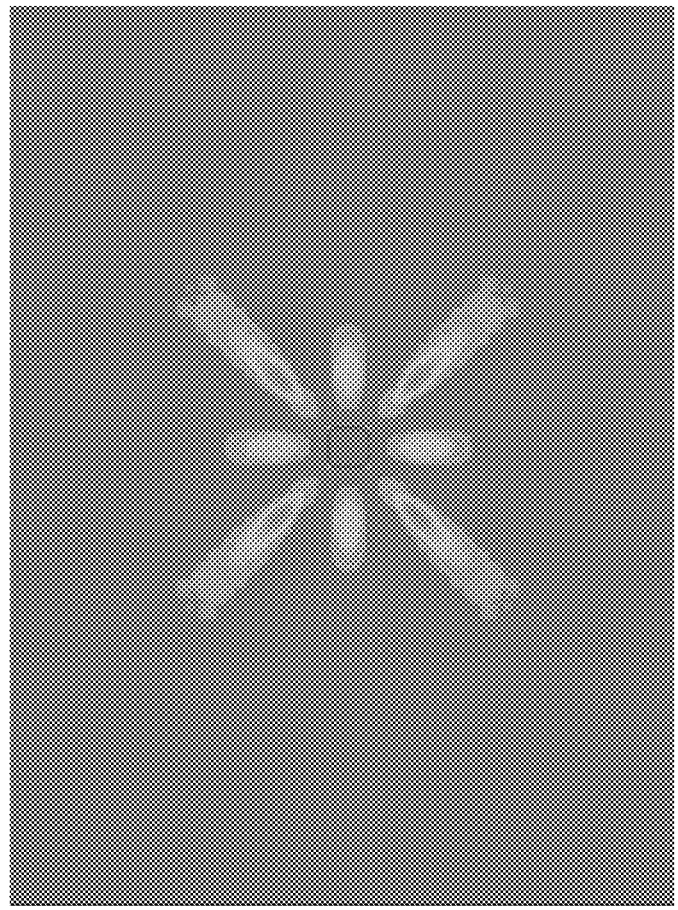
FIG. 13D shows a schematic view of intensity simulation of stray light in FIG. 13C.

FIG. 12B shows a top view of the vehicle instrument 40 according to the 8th embodiment in FIG. 12A. FIG. 12C shows a partial enlarged view of the vehicle instrument 40 according to the 8th embodiment in FIG. 12B. FIG. 12D shows another schematic view of the vehicle instrument 40 according to the 8th embodiment in FIG. 12A. As shown in FIGS. 12B and 12C, two of the camera modules 41 can be disposed in an inner space of the vehicle instrument 40. Specifically, the aforementioned two camera modules 41 can be disposed near a rear view mirror in the vehicle instrument 40 and a rear window, respectively. Moreover, two of the camera modules 41 can be disposed on non-mirror surfaces of two rear view mirrors on left and right side, respectively. As shown in FIG. 12D, via the configuration of the camera modules 41, it is favorable for the user obtaining the external space information out of the driving seat, such as the external space information S1, S2, S3, S4, but the present disclosure is not limited thereto. Hence, the field of view can be provided widely to decrease the blind spot, and it is favorable for improving driving safety.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A camera module, comprising:
    an imaging lens assembly module; and
    an image sensor disposed on an image surface of the imaging lens assembly module, and the image sensor comprising:
        a photoelectric converting layer for converting a light signal of an imaging light to an electric signal;
        a micro lens arrays layer for converging an energy of the imaging light into the photoelectric converting layer;
        a light filtering layer disposed between the photoelectric converting layer and the micro lens arrays layer, and the light filtering layer for absorbing a light at a certain wavelength region of the imaging light; and
        an anti-reflecting layer disposed on a surface of at least one of the light filtering layer and the micro lens arrays layer, wherein the anti-reflecting layer comprises an irregular nano-crystallite structure layer and an optical connecting layer, the optical connecting layer is for disposed on the surface of at least one of the light filtering layer and the micro lens arrays layer, and the optical connecting layer is connected to the irregular nano-crystallite structure layer;
    wherein a top of the optical connecting layer is partially covered by the irregular nano-crystallite structure layer;
    wherein the irregular nano-crystallite structure layer comprises a plurality of tapered ends.

2. The camera module of claim 1, wherein the anti-reflecting layer is disposed on an object-side surface of the micro lens arrays layer.

3. The camera module of claim 1, wherein the anti-reflecting layer is disposed between the light filtering layer and the micro lens arrays layer.

4. The camera module of claim 1, wherein the irregular nano-crystallite structure layer is made of metal oxide material.

5. The camera module of claim 1, wherein a material refractive index of the irregular nano-crystallite structure layer is Nc, a material refractive index of the optical connecting layer is Nf, and the following condition is satisfied:

$$Nf<Nc.$$

6. The camera module of claim 1, wherein a height of the irregular nano-crystallite structure layer is Hc, a film thickness of the optical connecting layer is Hf, a total height of the anti-reflecting layer is H, and the following conditions are satisfied:

$$Hf+Hc=H; \text{ and}$$

$$Hf<Hc.$$

7. The camera module of claim 1, wherein a film thickness of the optical connecting layer is Hf, and the following condition is satisfied:

$$20 \text{ nm}<Hf<120 \text{ nm}.$$

8. The camera module of claim 1, wherein a height of the irregular nano-crystallite structure layer is Hc, and the following condition is satisfied:

$$120 \text{ nm}<Hc<350 \text{ nm}.$$

9. The camera module of claim 1, wherein a size of each of micro lens elements of the micro lens arrays layer is Dp, and the following condition is satisfied:

0.2 μm<$Dp$<10 μm.

10. The camera module of claim 1, wherein a number of micro lens elements of the micro lens arrays layer is PN, and the following condition is satisfied:

7 million<$PN$<1 billion.

11. The camera module of claim 1, further comprising: a driving device for driving the image sensor.
12. An electronic device, comprising:
the camera module of claim 1.
13. A vehicle instrument, comprising:
the camera module of claim 1.
14. A camera module, comprising:
an imaging lens assembly module; and
an image sensor disposed on an image surface of the imaging lens assembly module, and the image sensor comprising:
a photoelectric converting layer for converting a light signal of an imaging light to an electric signal;
a micro lens arrays layer for converging an energy of the imaging light into the photoelectric converting layer;
a light filtering layer disposed between the photoelectric converting layer and the micro lens arrays layer, and the light filtering layer for absorbing a light at a certain wavelength region of the imaging light;
a cover glass, an inner space layer formed between the cover glass and the micro lens arrays layer, and the inner space layer isolated from an outer space of the image sensor; and
an anti-reflecting layer disposed on at least one surface of the cover glass, wherein the anti-reflecting layer comprises an irregular nano-crystallite structure layer and an optical connecting layer, the optical connecting layer is for disposed on the at least one surface of the cover glass, and the optical connecting layer is connected to the irregular nano-crystallite structure layer;
wherein a top of the optical connecting layer is partially covered by the irregular nano-crystallite structure layer;
wherein the irregular nano-crystallite structure layer comprises a plurality of tapered ends.

15. The camera module of claim 14, wherein the cover glass comprises an object-side surface and an image-side surface, and the anti-reflecting layer is disposed on the object-side surface and the image-side surface of the cover glass.

16. The camera module of claim 14, wherein a size of each of micro lens elements of the micro lens arrays layer is Dp, and the following condition is satisfied:

0.2 μm<$Dp$<10 μm.

17. The camera module of claim 14, wherein a number of micro lens elements of the micro lens arrays layer is PN, and the following condition is satisfied:

7 million<$PN$<1 billion.

18. The camera module of claim 14, further comprising:
a driving device for driving the image sensor.

* * * * *